(12) United States Patent
Tanaka et al.

(10) Patent No.: US 8,816,041 B2
(45) Date of Patent: Aug. 26, 2014

(54) POLYESTER POLYMERIZATION CATALYST AND METHOD FOR PRODUCING POLYESTER USING THE SAME

(75) Inventors: Yoichiro Tanaka, Mishima (JP); Eri Hatano, Mishima (JP); Keisuke Honda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 63 days.

(21) Appl. No.: 13/121,350

(22) PCT Filed: Aug. 18, 2009

(86) PCT No.: PCT/JP2009/064418
§ 371 (c)(1),
(2), (4) Date: Mar. 28, 2011

(87) PCT Pub. No.: WO2010/035591
PCT Pub. Date: Apr. 1, 2010

(65) Prior Publication Data
US 2011/0178265 A1    Jul. 21, 2011

(30) Foreign Application Priority Data
Sep. 29, 2008   (JP) .................................. 2008-250708

(51) Int. Cl.
*C08G 63/00*   (2006.01)
*B01J 23/00*   (2006.01)

(52) U.S. Cl.
USPC ......... 528/279; 502/350; 528/272; 528/308.1

(58) Field of Classification Search
USPC ....................................................... 528/279
See application file for complete search history.

(56) References Cited

U.S. PATENT DOCUMENTS
2007/0100124 A1*   5/2007   Maeda et al. ................. 528/279

FOREIGN PATENT DOCUMENTS

| | | |
|---|---|---|
| JP | 10-81646A A | 3/1998 |
| JP | 2001200045 | 7/2001 |
| JP | 2001524536 | 12/2001 |
| JP | 2002293909 | 10/2002 |
| JP | 2005-220278 A | 8/2005 |
| JP | 2007507577 T | 3/2007 |
| JP | 2008045117 A | 2/2008 |
| WO | 0100706 | 4/2001 |
| WO | WO02/16467 A1 | 2/2002 |
| WO | 03008479 | 1/2003 |
| WO | 2004111105 | 12/2004 |

OTHER PUBLICATIONS

Mary Lawson, Sugar Alcohol, Abstract and Article, Dec. 2000.*
International Search Report dated Nov. 17, 2009, application No. PCT/JP2009/064418.

* cited by examiner

*Primary Examiner* — Ling Choi
*Assistant Examiner* — Gennadiy Mesh
(74) *Attorney, Agent, or Firm* — RatnerPrestia

(57) ABSTRACT

Provided are a polyester polymerization catalyst with which the generation of foreign materials caused by the catalyst or mold pollution at the time of molding are reduced and polyesters having remarkably superior thermal stability and color tone can be obtained.

Provided is a polyester polymerization catalyst produced by the reaction of a titanium compound and a mannitol in a molar ratio of titanium atom to mannitol of from 1:1 to 1:3. A method for producing a polyester employs the polyester polymerization catalyst.

12 Claims, No Drawings

POLYESTER POLYMERIZATION CATALYST AND METHOD FOR PRODUCING POLYESTER USING THE SAME

CROSS-REFERENCE TO RELATED APPLICATIONS

This application is the U.S. National Phase application of PCT International Application No. PCT/JP2009/064418, filed Aug. 18, 2009, and claims priority of Japanese Patent Application No. 2008-250708, filed Sep. 29, 2008, the disclosures of such applications being incorporated herein by reference in their entirety for all purposes.

FIELD OF THE INVENTION

The present invention relates to polyester polymerization catalysts. Particularly, it relates to a polyester polymerization catalyst that does not cause increase in filtering pressure due to foreign matters resulted from the catalyst used in polymerization during the production of a polyester, that can afford a polyester being good in fiber forming property and better in the thermal stability and the color tone of the polymer, in comparison to conventional products, and that is very high in activity and hardly loses the activity.

BACKGROUND OF THE INVENTION

Polyesters are used for a variety of applications, for example, clothing applications, material applications, and medical applications, because of the usefulness of their functions. Particularly, polyethylene terephthalate is superior in general usability and practical utility and is preferably used.

While polyethylene terephthalate is generally produced from terephthalic acid or its ester-forming derivative and ethylene glycol, antimony compounds are used widely as polycondensation catalysts in commercial processes for producing high molecular weight polymers. However, polymers containing antimony compounds have some unfavorable properties as described below.

For example, it is known that when a polymer produced using an antimony catalyst is melt-spun into fibers, a residue of the antimony catalyst deposits around spinneret holes. The reason why the deposit of the residue of the antimony catalyst is formed is considered that an antimony compound in the polymer is denatured in the vicinity of the spinneret and a part of the antimony compound is vaporized and released and then components principally containing antimony remain at the spinneret. Because the progression of such deposition causes defects in filaments, the need for removing the deposit timely arises. Moreover, an antimony catalyst residue in a polymer has an unfavorable drawback that it is prone to form a comparatively large particle and becomes a foreign matter, causing increase in filtering pressure of a filter during the process, filament breakage in spinning, and film rupture in the production of a film and contributes to the reduction in operational efficiency.

Because of such background as described above, polyesters containing no antimony have been demanded. Then, there is known a germanium compound in seeking the role of a polycondensation catalyst in compounds other than antimony compounds, but it is difficult to use germanium compounds widely because they have scarcity value because of their small reserve.

On the other hand, the use of a titanium compound as a catalyst for polymerization is investigated actively for coping with that problem. Since titanium compounds are higher in catalytic activity than antimony compounds, a desired catalytic activity can be achieved by the addition in a small amount, and therefore generation of foreign matter particles or contamination of a spinneret can be inhibited. However, if a titanium compound is used as a polymerization catalyst, side reactions, such as a thermal decomposition reaction and an oxidative decomposition reaction, are also promoted because of the high reactivity of the titanium compound, resulting in a problem that thermal stability is deteriorated and the polymer becomes yellow. That a polymer becomes yellowish is undesirable because this results in deterioration of commercial value when, for example, a polyester is used in the form of fiber, especially fibers for clothing. As described above, in order to obtain a polyester that reduces the generation of foreign matters caused by a catalyst and mold pollution during molding and that has thermal stability and color tone remarkably improved, in comparison to conventional products, it is necessary to solve conflicting problems, i.e., to use a titanium compound as a polymerization catalyst without using an antimony catalyst and to control side reactions without impairing polymerization reaction activity.

On the other hand, there have been proposed as a polymerization catalyst a composition comprising a titanium compound, a phosphorus compound and an amine (patent document 1) and a reaction product resulting from a titanium compound, a phosphorus compound and an aromatic polycarboxylic acid or its anhydride (patent documents 2 to 4). It is possible to reduce foreign matters caused by catalysts by these methods, but resulting polymers do not have satisfactory color tone. Therefore, further improvement of titanium compounds is demanded.

The coloring or the deterioration of heat resistance of a polyester is caused by a side reaction of polyester polymerization as explicitly disclosed in Saturated Polyester Resin Handbook (published by The Nikkan Kogyo Shimbun, Ltd., the first edition, pp. 178-198). In this side reaction of a polyester, a carbonyl oxygen is activated by a metal catalyst having Lewis acidity and thereby beta hydrogen is removed, so that a vinyl terminal group component and an aldehyde component are generated. Such a side reaction triggers coloring of a polymer into yellow color and breakage of ester linkages of the main chain, affording a polymer that is inferior in heat resistance. In particular, when a titanium compound is used as a polymerization catalyst, a large amount of a vinyl terminal group component and an aldehyde component are generated because a side reaction is strongly activated by heat, resulting in a polymer that has been colored in yellow and is inferior in heat resistance. The mechanism of this coloring has not been known perfectly, but it is presumed that a titanium compound and some impurities are coordinated specifically together to produce color. Then, there has been obtained a hypothesis that if a ligand capable of including titanium is used, it is possible to reduce the Lewis acidity of a titanium compound, and therefore the activation of a carbonyl oxygen is inhibited and, as a result, the breakage of ester linkages of the main chain and the generation of vinyl terminal group components and aldehyde components are inhibited, so that the thermal stability of a polymer is good and, moreover, the specific coordination between the titanium compound and impurities can be inhibited and therefore it is possible to inhibit coloring. Then, in aspects of the present invention, as a result of intensive investigations on the basis of this hypothesis for improving the above-mentioned problems, there have been obtained findings that by using mannitol, which is a polyhydric alcohol, as a ligand and making it react with titanium, it is possible to attain the benefits according to exemplary aspects of the present invention. The present invention, according to exemplary embodiments, is specific in the case of using mannitol among polyhydric alcohols, and it was found that a catalyst obtained by making mannitol and a titanium compound react together had a remarkable color tone improving effect. Concretely, it was found that the use a dihydric alcohol, such as ethylene glycol, or a trihydric alcohol, such as glycerol, instead of mannitol failed to exhibit an effect of improving the color tone of a resulting polymer or improvement in thermal stability and mannitol remarkably had these effects. Moreover, it was found that this catalyst was able to reduce foreign matters caused by a catalyst and it not only was superior in the storage stability of a catalyst but also hardly was deactivated even in a polymerization system and was able to greatly reduce a polymerization time. It is presumed that these phenomena are caused by the fact that since a ligand has coordinated to titanium to include it, the compatibility of a titanium compound to PET is increased and the generation of titanium oxide is inhibited which is formed by the reaction of the titanium compound with slightly existing water in the polymerization system.

As a titanium catalyst containing a polyhydric alcohol as a polymerization catalyst, there is a reaction product resulting from a titanium compound, an alcohol having at least two hydroxyl groups, a phosphorus compound, and a base (patent document 5), but the alcohol having two hydroxyl groups as referred to therein principally represents a dihydric alcohol and polyhydric alcohols having five or more hydroxyl groups are not disclosed. Moreover, a titanium-containing solution that contains a titanium compound, an aliphatic diol, and a polyhydric alcohol having three or more alcoholic hydroxyl groups is disclosed (patent document 6). The polyhydric alcohol having three or more alcoholic hydroxyl groups is used as a dissolution assistant for a purpose of increasing the solubility of a catalyst and thereby increasing the stability of a catalyst solution so as not to allow any precipitation to generate and a purpose of failing to have a bad influence on the quality of an aliphatic diol to be recovered and reused, and therefore it is basically different from embodiments of the present invention. Moreover, there is no disclosure about an effect of improving the color tone of a polymer to be obtained or the improvement in heat resistance and there is no concrete disclosure about mannitol. Aside from the above, a catalyst for polyester production that contains titanium oxide as a primary component and also contains a polyhydric alcohol is disclosed (patent document 7), but this is different from embodiments of the present invention because titanium oxide is generally low in reactivity, so that it is not able to react with a ligand, and it also is low in polymerization activity. Moreover, there is no concrete disclosure about mannitol.

While polyethylene terephthalate, one of the raw materials of which is terephthalic acid, is generally produced by performing an esterification reaction from terephthalic acid and ethylene glycol and a subsequent polycondensation reaction, it is presumed that it is possible to shorten the esterification reaction time and thereby inhibit coloring if a catalyst for polyester production is added before the esterification reaction. However, a titanium catalyst is generally unstable to water and therefore it reacts with water that is produced as a by-product of an esterification reaction. Thus, it forms a titanium oxide and loses its activity, resulting in the delay of an esterification reaction and a polycondensation reaction and eventually affording a deeply colored polymer.

DOCUMENTS

Patent Documents

Patent document 1: JP 2002-512267 T
Patent document 2: WO 01/00706
Patent document 3: JP 2002-293909 A
Patent document 4: WO 03/008479
Patent document 5: JP 2001-524536 T
Patent document 6: WO 2004/111105
Patent Document 7: JP 2001-200045 A

SUMMARY OF THE INVENTION

The embodiments of the present invention provide a polyester polymerization catalyst with which the generation of foreign materials caused by a catalyst or mold pollution at the time of molding are reduced and polyesters having remarkably superior thermal stability and color tone in comparison to conventional products can be obtained, and a method for producing a polyester using the same.

The polyesters of the present invention can be attained by a polyester polymerization catalyst to be obtained by making a titanium compound and mannitol react together in a molar ratio of titanium atom to mannitol of from 1:1 to 1:3 and a method for producing a polyester by using the catalyst.

The polyester polymerization catalyst according to embodiments of the present invention not only is superior in storage stability of a catalyst but also hardly is deactivated even in a polymerization system and is very high in activity, so that it can greatly reduce a polymerization time. Moreover, it can also inhibit the generation of foreign matters caused by catalysts. Furthermore, a polyester to be obtained by polycondensation in the presence of the catalyst come to have remarkably improved thermal stability and color tone in comparison to conventional polyesters and can solve such problems as color tone deterioration, spinneret contamination, increase in filtering pressure, and filament breakage, in the production of molded articles for fibers, films, bottles, and so on.

DETAILED DESCRIPTION OF THE INVENTION

The polyester to be obtained by the method for producing a polyester of the present invention is a polymer to be synthesized from a dicarboxylic acid or its ester-forming derivative and an alkylene glycol or its ester-forming derivative, and it is not particularly restricted if it can be used as molded articles, such as fibers, films, and bottles.

Specific examples of such a polyester include polyethylene terephthalate, polytrimethylene terephthalate, polytetramethylene terephthalate, polycyclohexylenedimethylene terephthalate, polyethylene-2,6-naphthalene dicarboxylate, and polyethylene-1,2-bis(2-chlorophenoxy)ethane-4,4'-dicarboxylate. The present invention is suitable for polyethylene terephthalate, which is used for the widest variety of applications, or polyester copolymers containing mainly ethylene terephthalate units in an amount of 80 mol % or more.

In such polyesters, a dicarboxylic acid, such as isophthalic acid, naphthalenedicarboxylic acid, 4,4'-diphenyldicarboxylic acid, and cyclohexanedicarboxylic acid, its ester-forming derivative, a dioxy compound, such as polyethylene glycol, hexamethylene glycol, neopentyl glycol, polypropylene glycol, and cyclohexane dimethanol, its ester-forming derivative, and so on may have been copolymerized as a copolymerization component.

Generally, a series of reactions for synthesizing a polyester from a dicarboxylic acid or its ester-forming derivative and an alkylene glycol or its ester-forming derivative comprise the following reactions (1) to (3):
(1) an esterification reaction that is a reaction of a dicarboxylic acid component with an alkylene glycol component;
(2) a transesterification reaction that is a reaction of an ester-forming derivative component of a dicarboxylic acid with an alkylene glycol component; and
(3) a polycondensation reaction by which a polyethylene terephthalate low polymer obtained upon the completion of the esterification reaction or the transesterification reaction is made to have a higher degree of polymerization through a de-alkylene glycol reaction.

The polyester polymerization catalyst of the present invention refers to a substance that has an effect of contributing to the promotion of the reactions (1) and (3) among the above-mentioned (1) to (3). Therefore, titanium oxide particles that have generally been used as inorganic particles as a matting agent for fibers, and so on have substantially no catalytic action on the above-mentioned reactions and therefore differ from a titanium compound that can be used as the polyester polymerization catalyst of the present invention.

It is necessary for the polyester polymerization catalyst of at least one embodiment of the present invention that a titanium compound and mannitol are made to react in a molar ratio of titanium atom to mannitol of from 1:1 to 1:3.

Since a catalyst is stable also in the presence of water molecules if mannitol, which can enclose titanium, is used as a ligand as mentioned above, the catalyst will not lose its activity even if it is added before the esterification reaction which produces a large amount of water as a by-product in the above (1), and as a result the esterification reaction and a polycondensation reaction advance in a shorter time than before and coloring can be inhibited. This effect is specific in the use of a catalyst prepared by using mannitol, which is a polyhydric alcohol, as a ligand and making it react with titanium.

The titanium compound in the polyester polymerization catalyst is preferably an orthoester or condensed orthoester of titanium. Specific examples thereof include titanium tetrabutoxide, titanium tetraisopropoxide, titanium tetraethoxide, and titanium tetramethoxide, and particularly preferred is titanium tetraisopropoxide, which is comparatively stable and easy to handle contrary to being good in reactivity.

The mannitol to be made to react with titanium includes D-mannitol and L-mannitol, any one of which may be used and a mixture of which can also be used. From an economic viewpoint, preferred is D-mannitol, which occurs naturally in a larger amount than the other.

When making a titanium compound and mannitol react, it is preferred to make them react in a molar ratio of the number of moles of titanium atom to the number of moles of mannitol of from 1:1 to 1:3, and it is more preferred from an economical viewpoint to make them react in a molar ratio of from 1:1 to 1:2.

When making a titanium compound and mannitol react, it is preferred to further make a base react because the stability against water is thereby increased.

The base to be used in the present invention, for example, is an amine compound or an alkali metal compound, and specific examples thereof include lithium hydroxide, sodium hydroxide, potassium hydroxide, ammonium hydroxide, tetrabutylammonium hydroxide, lithium carbonate, sodium carbonate, potassium carbonate, lithium acetate, sodium acetate, potassium acetate, ammonia, and triethylamine, and lithium hydroxide or sodium hydroxide is particularly preferred because the color tone of a polymer to be obtained becomes good and the polymerization activity also becomes high.

As to the amount of the base to be made to react, if the base is used excessively the color tone of a resulting polymer may be deteriorated and the polymerization activity may be lost. The ratio of the number of moles of the base to the number of moles of the titanium atoms of the titanium compound is preferably from 1:1 to 0.01:1 and, from the viewpoint of polymerization activity, it is more preferably from 0.2:1 to 0.01:1.

When making a titanium compound and mannitol react, the reaction is performed in a solvent and the solvent to be used here is preferably a solvent in which the titanium compound and mannitol are soluble, and particularly, water, ethylene glycols, or their mixture is more preferred.

The concentration in making a titanium compound and mannitol react is preferably such a concentration that both the titanium compound and the mannitol can dissolve, and it specifically is preferred that the concentration of mannitol be from 0.2 to 0.02 mol/L.

As to the temperature in making a titanium compound and mannitol react, since a reaction between titanium and a solvent occurs with priority, it is preferred to perform the reaction at a temperature of up to 60° C., more preferably at 0 to 40° C.

The reaction time in making a titanium compound and mannitol react is preferably from 0.1 to 24 hours and more preferably from 0.5 to 1 hour.

In a method of preparing the polyester polymerization catalyst of the present invention, it is preferred that mannitol be dissolved first in water, ethylene glycol, or their mixture and a titanium compound be added thereto. The titanium compound in this case is preferably added as a neat liquid or after being dissolved and diluted in ethylene glycol. Then, it is preferred to add a base in order to improve the stability of the catalyst against water, and the base in this embodiment is preferably added after being dissolved and diluted in water.

If a polyester is produced by performing an esterification reaction or/and polycondensation in the presence of a titanium-based polymerization catalyst obtained in this way, the color tone and the heat resistance of a polymer to be obtained will be improved greatly.

In the method for producing a polyester of the present invention, it is preferred to add a titanium compound, except for titanium oxide particles, to be added for the purpose of matting, in an amount of from 1 to 20 ppm, more preferably from 5 to 10 ppm, in terms of titanium atoms relative to the polymer to be obtained because the thermal stability or the color tone of the polymer becomes better. Moreover, as described above, it is preferred to make them react in a molar ratio of the number of moles of titanium atom to the number of moles of mannitol of from 1:1 to 1:3, and it is more preferred from an economic viewpoint to make them react in a molar ratio of from 1:1 to 1:2. Consequently, it is preferred to add mannitol so that its amount may become from 1 to 50 ppm relative to the polymer to be obtained.

In the method for producing a polyester of the present invention, it is permissible to add a phosphorus compound together with a titanium compound so that the amount of the phosphorus compound may become from 1 to 70 ppm in terms of phosphorus atoms relative to the polyester. In such a case, the added amount of phosphorus may be adjusted to 10 to 50 ppm from the viewpoint of the thermal stability or the color tone of the polyester in fiber production or film production. The thermal stability or the color tone of the polyester becomes good if the molar ratio of the titanium atom of the titanium compound to the phosphorus atom in the phosphorus compound is P/Ti=0 to 16.50. The thermal stability and the color tone are good and the polymerization time does not delay if P/Ti=1.50 to 3.50.

The phosphorus compound may be a phosphite compound, a phosphonite compound, a phosphinite compound, and a phosphine compound, which are trivalent phosphorus compounds, or a phosphate compound, a phosphonate compound, a phosphinate compound, and a phosphine oxide compound, which are pentavalent phosphorus compounds. Specifically, examples of the trivalent phosphorus compounds include trimethylphosphite, triethylphosphite, triphenylphosphite, 3,9-bis(2,6-di-tert-butyl-4-methylphenyl)-2,4,8,10-tetraoxa-3,9-diphosphaspiro[5,5]undecane represented by formula (1) (PEP-36: produced by Adeka Corporation), diethylphenyl phosphonite, a dioctylphenyl phosphonite, tetrakis(2,4-di-tert-butylphenyl) [1,1-biphenyl]-4,4'-diylbisphosphonite represented by formula (2) (IRGAFOS P-EPQ: produced by Ciba Specialty Chemicals or Sandostab P-EPQ: produced by Clariant Japan), tetrakis(2,4-di-tert-butyl-5-methylphenyl) [1,1-biphenyl]-4,4'-diylbisphosphonite represented by formula (3) (GSY-P101: produced by Osaki Industry Co., Ltd.), and bis(2,4-di-t-butylphenyl)pentaerythritol diphosphite represented by a formula (4) (ADK STAB PEP 24G: produced by Adeka Corporation).

Formula 1:

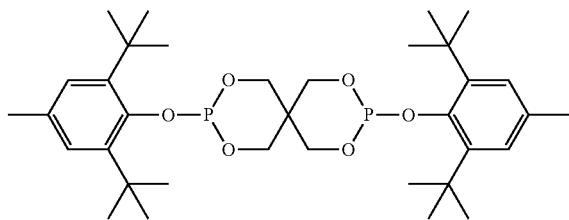

(1)

Formula 2:

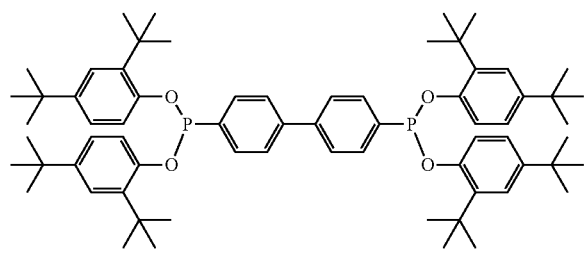

Formula 3:

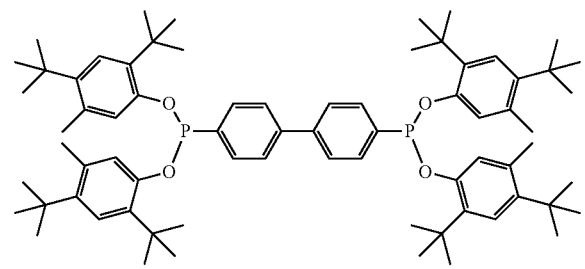

(3)

Formula 4:

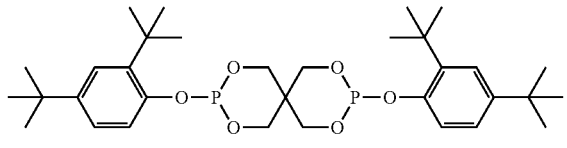

(4)

Examples of the pentavalent phosphorus compounds include tributyl phosphate, triphenyl phosphate, diethyl phenyl phosphonate, dibutyl phenyl phosphonate, dioctyl phenyl phosphonate, tetraethyl[1,1-biphenyl]-4,4'-diyl bisphosphonate represented by formula (5), triphenylphosphine oxide, phenylphosphonic acid, methylphosphonic acid, ethylphosphonic acid, propylphosphonic acid, isopropylphosphonic acid, butylphosphonic acid, tolylphosphonic acid, xylylphosphonic acid, biphenylphosphonic acid, naphthylphosphonic acid, anthrylphosphonic acid, 2-carboxyphenylphosphonic acid, 3-carboxyphenylphosphonic acid, 4-carboxyphenylphosphonic acid, 2,3-dicarboxyphenylphosphonic acid, 2,4-dicarboxyphenylphosphonic acid, 2,5-dicarboxyphenylphosphonic acid, 2,6-dicarboxyphenylphosphonic acid, 3,4-dicarboxyphenylphosphonic acid, 3,5-dicarboxyphenylphosphonic acid, 2,3,4-tricarboxyphenylphosphonic acid, 2,3,5-tricarboxyphenylphosphonic acid, 2,3,6-tricarboxyphenylphosphonic acid, 2,4,5-tricarboxyphenylphosphonic acid, 2,4,6-tricarboxyphenylphosphonic acid, phenylphosphinic acid, methylphosphinic acid, ethylphosphinic acid, propylphosphinic acid, isopropylphosphinic acid, butylphosphinic acid, tolylphosphinic acid, xylylphosphinic acid, biphenylylphosphinic acid, diphenylphosphine acid, dimethylphosphine acid, diethylphosphinic acid, dipropylphosphinic acid, diisopropylphosphinic acid, dibutylphosphinic acid, ditolylphosphinic acid, dixylylphosphinic acid, dibiphenylylphosphinic acid, naphthylphosphinic acid, anthrylphosphinic acid, 2-carboxyphenylphosphinic acid, 3-carboxyphenylphosphinic acid, 4-carboxyphenylphosphinic acid, 2,3-dicarboxyphenylphosphinic acid, 2,4-dicarboxyphenylphosphinic acid, 2,5-dicarboxyphenylphosphinic acid, 2,6-dicarboxyphenylphosphinic acid, 3,4-dicarboxyphenylphosphinic acid, 3,5-dicarboxyphenylphosphinic acid, 2,3,4-tricarboxyphenylphosphinic acid, 2,3,5-tricarboxyphenylphosphinic acid, 2,3,6-tricarboxyphenylphosphinic acid, 2,4,5-tricarboxyphenylphosphinic acid, 2,4,6-tricarboxyphenylphosphinic acid, bis(2-carboxyphenyl)phosphinic acid, bis(3-carboxyphenyl)phosphinic acid, bis(4-carboxyphenyl)phosphinic acid, bis(2,3-dicarboxylphenyl)phosphinic acid, bis(2,4-dicarboxyphenyl)phosphinic acid, bis(2,5-dicarboxyphenyl)phosphinic acid, bis(2,6-dicarboxylphenyl)phosphinic acid, bis(3,4-dicarboxyphenyl)phosphinic acid, bis(3,5-dicarboxyphenyl)phosphinic acid, bis(2,3,4-tricarboxyphenyl)phosphinic acid, bis(2,3,5-tricarboxyphenyl)phosphinic acid, bis(2,3,6-tricarboxyphenyl)phosphinic acid, bis(2,4,5-tricarboxyphenyl)phosphinic acid and bis(2,4,6-tricarboxyphenyl)phosphinic acid, dimethyl phenylphosphinate, diethyl phenylphosphinate, and diphenyl benzylphosphinate.

Formula 5:

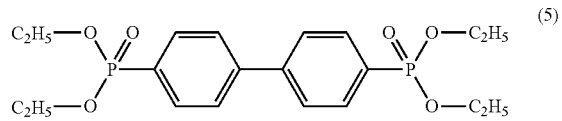

In the method for producing a polyester of the present invention, according to at least one embodiment, a magnesium compound as a co-catalyst and a cobalt compound as a co-catalyst and for color tone adjustment may be used together. Specific examples of the magnesium compound to be used in this case include magnesium oxide, magnesium hydroxide, magnesium alkoxides, magnesium acetate, and magnesium carbonate. Specific examples of the cobalt compound include cobalt chloride, cobalt nitrate, cobalt carbonate, cobalt acetylacetonate, cobalt naphthenate, and cobalt acetate tetrahydrate.

In the method for producing a polyester of the present invention, in another embodiment, a blue adjusting agent and/or a red adjusting agent may be added as a color tone adjusting agent instead of cobalt.

The color tone adjusting agent is a dye and/or a pigment for dope dyeing to be used for resins and includes solvent dyes, vat dyes, disperse dyes, and organic pigments. Specific examples provided with reference to color index generic names include SOLVENT BLUE 104, SOLVENT BLUE 122, and SOLVENT BLUE 45 as blue adjusting agents, SOLVENT RED 111, SOLVENT RED 179, SOLVENT RED 195, SOLVENT RED 135, PIGMENT RED 263, and VAT RED 41 as red adjusting agents, and DESPERSE VIOLET 26, SOLVENT VIOLET 13, SOLVENT VIOLET 36, SOLVENT VIOLET 37, and SOLVENT VIOLET 49 as violet adjusting agents. Particularly, there are preferably used SOLVENT BLUE 104, SOLVENT BLUE 45, SOLVENT RED 179, SOLVENT RED 195, SOLVENT RED 135, SOLVENT VIOLET 36, and SOLVENT VIOLET 49, which contain no halogen, which readily causes apparatus corrosion, and which are comparatively superior in heat resistance at high temperatures and superior in color developing property.

Moreover, one or two or more of such color tone adjusting agents may be used according to the intended purpose. Particularly, the use of one or more blue adjusting agents and one or more red adjusting agents is preferred because it allows the color tone to be controlled finely. Moreover, in this case, when the ratio of the blue adjusting agent to the whole amount of the color tone adjusting agent to be added is 50% by weight or more, the color tone of the resulting polyester becomes particularly good.

The final content of the color tone adjusting agent to the polyester is preferably from 0 to 10 ppm. If it exceeds 30 ppm, the transparency of the polyester may deteriorate or a dull color may be produced.

In a further embodiment of the method for producing a polyester of the present invention, while a polymerization catalyst or an additive may be added as it is to the reaction system of a polyester, the formation of foreign matters in a polymer is inhibited more if the compounds are mixed with a solvent containing an alkylene glycol component capable of forming a polyester, such as ethylene glycol, to form a solution or a slurry, and it is then added to a reaction system after, if necessary, the removal of low-boiling components such as water used in the preparation of the compounds. As to the time of the addition, it is preferred to add it after the completion of the esterification reaction or a transesterification reaction and before the commencement of the polycondensation reaction.

While the order of the addition of the polyester polymerization catalyst, the phosphorus compound, the magnesium compound, the cobalt compound, and the color tone adjusting agent to the reaction system is not particularly limited, it is preferred to add the polyester polymerization catalyst and other additives, i.e., the phosphorus compound, the magnesium compound, the cobalt compound, and the color tone additive separately to the reaction system.

It is preferable with the polyester to be obtained by the method for producing a polyester of the present invention that the intrinsic viscosity ($\eta$), measured at 25° C. using orthochlorophenol as a solvent, be from 0.4 to 1.0 dL/g. It is more preferably from 0.5 to 0.8 dL/g, and particularly preferably from 0.6 to 0.7 dL/g.

In order to increase thermal stability, which is a purpose of the present invention, it is preferred that the terminal carboxyl group concentration of a polyester be within a range of from 1 to 40 Eq/ton. The lower the terminal carboxyl group concentration, the more the thermal stability improves, resulting in remarkable decrease in contamination that attaches to a mold or the like at the time of molding or contamination that attaches to a spinneret at the time of fiber production. When the terminal carboxyl group concentration exceeds 40 Eq/ton, the effect of reducing the contamination that attaches to a mold or a spinneret may become reduced. The terminal carboxyl group concentration is preferably 35 Eq/ton or less.

It is preferable with the polyester to be obtained by the method for producing a polyester of the present invention that the content of the diethylene glycol be from 0.1 to 1.5% by weight because if so mold pollution hardly occurs. It is more preferably 1.3% by weight or less, and particularly preferably 1.1% by weight or less.

Moreover, it is preferable with the polyester to be obtained by the method for producing a polyester of the present invention that the content of acetaldehyde be from 1 to 15 ppm because if so bad influence to flavor and aroma in molded articles is controlled. It is more preferably 13 ppm or less, and particularly preferably 11 ppm or less.

It is preferred from the viewpoint of the color tone of molded articles, such as fibers and films, that the color tone in a chip be within a range of L value of from 70 to 90, a range of a value of from −6 to 2, and a range of b value of from −5 to 3, respectively.

It is preferable from the viewpoint of the thermal stability of a polymer that the polyester to be obtained by the method for producing a polyester of the present invention exhibit a change in color tone value b, $\Delta$b value, after drying at 150° C. for 12 hours under reduced pressure and subsequent melting at 290° C. for 60 minutes under nitrogen atmosphere within a range of from −5 to 5. The smaller this value is, the less decomposition and coloring caused by thermal degradation are and the better the thermal stability is. When this value exceeds 5, a polymer will discolor at the time of spinning and molding, resulting in serious influence on quality. It is more preferably 4 or less and particularly preferably 3 or less.

The polyester to be obtained by the method for producing a polyester of the present invention is preferably converted to a material useful as a fiber by being molded into a filament form by, for example, melt-extrusion forming, and then subjected to stretching or the like.

The method for producing a polyester according to embodiments of the present invention is described. An example relating to polyethylene terephthalate is described as a specific example, but the product is not limited to this.

Polyethylene terephthalate is usually produced by one of the following processes.

(A) A process using terephthalic acid and ethylene glycol as raw materials, wherein a low polymer is obtained by a direct esterification reaction and then a high molecular weight polymer is obtained by a subsequent polycondensation reaction.
(B) A process using dimethyl terephthalate and ethylene glycol as raw materials, wherein a low polymer is obtained by a transesterification reaction and then a high molecular weight polymer is obtained by a subsequent polycondensation reaction.

Although the esterification reaction proceeds even in the absence of catalysts, the transesterification reaction is made to proceed using a compound of magnesium, calcium, lithium, etc., as a catalyst or after the substantial completion of the transesterification reaction a phosphorus compounds is added for the purpose of inactivating the catalyst used for the reaction.

A polyester to be obtained by the method for producing a polyester of the present invention is preferably one afforded by obtaining a high molecular weight polyethylene terephthalate by performing a polycondensation reaction after adding a polyester polymerization catalyst in (A) or adding a polyester polymerization catalyst and, if necessary, a phosphorus compound, a magnesium compound, a cobalt compound, a color tone adjusting agent, and titanium oxide particles to a low polymer obtained in the first half of a series of reactions of (A) or (B).

The above-mentioned reaction can be adapted for systems, such as a batch system, a semibatch system, or a continuous system.

EXAMPLES

The present invention will be described below in more detail by way of Examples. Every mannitol that appears in the Examples represents D-mannitol. Physical property values were measured by the methods described below.

(1) Contents of Titanium, Phosphorus, Antimony, Magnesium, Cobalt Elementals in Polymer.

A polyester polymer was dissolved in orthochlorophenol and, if necessary, the viscosity of the polymer solution was adjusted with chloroform. Then, titanium oxide particles were sedimented with a centrifuge and subsequently only supernatant liquid was collected by decantation. A polymer was reprecipitated by the addition of acetone, filtered, and washed, affording a polymer sample from which particles had been removed. The polymer sample was heated to melt on an aluminum plate, and then a molded article having a plane by using a compression press, followed by determining the contents by using a X-ray fluorescence elemental analyzer (manufactured by Rigaku Corp., System 3270).

(2) Intrinsic Viscosity IV of Polymer.

Measurement was conducted at 25° C. by using orthochlorophenol as a solvent.

(3) Carboxyl Terminal Group Content of Polymer.

Measurement was done by performing titration with an automatic titrator (manufactured by Hiranuma Sangyo Co., Ltd., COM-550) using orthocresol as a solvent and a 0.02-N aqueous NaOH solution at 25° C.

(4) Color Tone of Polymer.

Measurement was done as hunter values (L, a, b) by using a color difference meter (SM colorcomputer Model SM-T45, manufactured by Suga Test Instruments Co., Ltd.).

(5) Diethylene Glycol Content of Polymer.

Monoethanolamine was used as a solvent, A 1,6-hexanediol/methanol mixed solution was added, cooled, neutralized, and followed by centrifuging, and then the supernatant liquid was measured by gas chromatography (manufactured by Shimadzu Corp., GC-14A).

(6) Dipropylene Glycol (DPG) Content and Dibutylene Glycol (DBG) Content of Polymer.

$^1$H-NMR was measured by using UNITYINOVA600 manufactured by VARIAN and quantification was done from the integration ratio of the resulting signals.

(7) Acetaldehyde Content of Polymer.

A polyester and pure water were subjected to heat extraction at 160° C. under nitrogen seal for two hours, and the amount of acetaldehyde in the extract was quantified by using gas chromatography ("GC-14A" produced by Shimadzu Corporation) using isobutanol as an internal standard.

(8) Δb Value 290.

A polyester chip was dried under reduced pressure at 150° C. for 12 hours, and then heated to melt at 290° C. under nitrogen atmosphere for 60 minutes. Subsequently, color tone was measured by the method of (4) and the difference between before and after the heat melting was measured as a Δb value 290.

(9) Observation of Deposition of Spinneret.

A polyester was vacuum dried at 150° C. for 12 hours, then fed to a spinning machine, subsequently melted with a melter of a spinning temperature of 285° C., and thereafter discharged through a spinneret with 16 holes of 0.18 mm in diameter and pulled at a rate of 1000 m/min, affording 300 dtex/36 filaments. The amount of a deposition around the spinneret holes 72 hours after the spinning of fibers was observed using a long focus microscope. A state where almost no deposition was found was judged as ○ (qualified) and a state where a deposition was found and fiber breaking generated frequently was judged as x (disqualified).

(10) Content of Mannitol in a Polymer.

Monoethanolamine was used as a solvent, A 1,6-hexanediol/methanol mixed solution was added, cooled, neutralized, and followed by centrifuging, and then the supernatant liquid was measured by LC-MS (manufactured by Warters Corp.).

Example 1

To a 3-L, three-necked flask, which had been filled with nitrogen, were added 1000 mL of dehydrated ethylene glycol (produced by Wako Pure Chemical Industries, Ltd.) as a reaction solvent and 5.7 g (31.3 mmol) of mannitol (produced by Tokyo Chemical Industry Co., Ltd.), which were then stirred while being heated on an oil bath so that the internal temperature would become 80° C. Since the mannitol dissolved in about one hour, the oil bath was removed and cooling was conducted until the internal temperature became 40° C., which was a reaction temperature. When the internal temperature reached 40° C., 2.69 g (15.7 mmol) of titanium tetramethoxide (produced by Aldrich) was added as a titanium compound, followed by stirring at a reaction temperature of 40° C. over a reaction time of 24 hours. In this way, a colorless, transparent catalyst solution TM-1 (titanium content: 0.75 g/L) was obtained.

Examples 2 to 6, 14

Catalyst solutions TM-2 to 4, 6, and 14 (titanium content: 0.75 g/L) were obtained in the same manner as in Example 1 except for changing the titanium compound, the molar ratio mannitol/Ti, the reaction temperature, the reaction time, and the reaction solvent as shown in Table 1. Only in TM-5, because a white precipitate was formed, water was removed by freeze drying and then the collected white solid was dispersed in ethylene glycol, affording a catalyst suspension TM-5 (titanium content: 0.75 g/L).

Example 7

To a 3-L, three-necked flask, which had been filled with nitrogen, were added 1000 mL of dehydrated ethylene glycol as a reaction solvent and 5.7 g (31.3 mmol) of mannitol, which were then stirred while being heated on an oil bath so that the internal temperature would become 80° C. Since the mannitol dissolved in about one hour, the oil bath was removed and cooling was conducted until the internal temperature became 25° C., which was a reaction temperature. When the internal temperature reached 25° C., 4.45 g (15.7 mmol) of titanium tetraisopropoxide (produced by Wako Pure Chemical Industries, Ltd.) was added as a titanium compound and subsequently 1.57 mL (1.57 mmol) of 1-mol/L aqueous solution of sodium hydroxide (produced by Wako Pure Chemical Industries, Ltd.) was added as a base, followed by stirring at a reaction temperature of 25° C. over a reaction time of one hour. In this way, a colorless, transparent catalyst solution TM-7 (titanium content: 0.75 g/L) was obtained.

Examples 8 to 13, 15

Catalysts TM-8 to 13, and 15 (titanium content: 0.75 g/L) were obtained in the same manner as in Example 7 except for changing the base and the molar ratio base/Ti as shown in Table 1.

Example 16

To a 3-L, three-necked flask, which had been filled with nitrogen, were added 1000 mL of dehydrated ethylene glycol as a reaction solvent and 5.7 g (31.3 mmol) of mannitol, which were then stirred while being heated on an oil bath so that the internal temperature would become 80° C. Since the mannitol dissolved in about one hour, the oil bath was removed and cooling was conducted until the internal temperature became 25° C., which was a reaction temperature. When the internal temperature reached 25° C., 1.57 mL (1.57 mmol) of 1-mol/L aqueous solution of sodium hydroxide (produced by Wako Pure Chemical Industries, Ltd.) was added as a base and 4.45 g (15.7 mmol) of titanium tetraisopropoxide (produced by Wako Pure Chemical Industries, Ltd.) was added as a titanium compound, so that a white precipitate was formed. Subsequently, stirring was performed at a reaction temperature of 25° C. over a reaction time of one hour. In this way, a catalyst suspension TM-16 (titanium content: 0.75 g/L) was obtained.

Comparative Example 1

To a 3-L, three-necked flask, which had been filled with nitrogen, was added 1000 mL of dehydrated ethylene glycol as a reaction solvent, which was then adjusted to 25° C., which was a reaction temperature, by the use of a thermostatic bath. Thereto was added 4.45 g (15.7 mmol) of titanium tetraisopropoxide, which was then stirred at a reaction temperature of 25° C. over a reaction time of one hour. In this way, a colorless, transparent catalyst solution C-1 (titanium content: 0.75 g/L) was obtained.

Comparative Example 2

Since a white precipitate was formed as a result of performing the same operation as that of Comparative Example 1 using water as a reaction solvent, the solvent water was removed by freeze drying, and the collected white solid was dispersed in ethylene glycol, affording a catalyst suspension C-2 (titanium content: 0.75 g/L).

Comparative Examples 3 and 6

Colorless, transparent catalyst solutions C-3 and 6 (titanium content: 0.75 g/L) were obtained in the same manner as in Example 1 except for changing the molar ratio mannitol/Ti, the reaction temperature, and the reaction time as shown in Table 1.

Comparative Examples 4 and 5

Catalysts C-4 and 5 (titanium content: 0.75 g/L) were obtained in the same manner as in Example 7 except for changing the molar ratio mannitol/Ti, the base and the molar ratio base/Ti as shown in Table 1.

Comparative Examples 7 to 11

Colorless, transparent catalyst solutions C-7 to 11 (titanium content: 0.75 g/L) were obtained in the same manner as in Example 1 except for using other polyhydric alcohols instead of mannitol, setting the molar ratio mannitol/Ti to 2, and changing the reaction temperature and the reaction time as shown in Table 1.

TABLE 1

| | Name of catalyst | Titanium compound | Molar ratio of mannitol/Ti | Base | Molar ratio of base/Ti | Reaction conditions in catalyst preparation Temperature (° C.) | Time (h) | Solvent |
|---|---|---|---|---|---|---|---|---|
| Example 1 | TM-1 | TMT | 2 | — | — | 40 | 24 | EG |
| Example 2 | TM-2 | TET | 2 | — | — | 0 | 0.1 | EG |
| Example 3 | TM-3 | TPT | 1 | — | — | 40 | 0.5 | EG |
| Example 4 | TM-4 | TPT | 2 | — | — | 25 | 1 | EG |
| Example 5 | TM-5 | TPT | 2 | — | — | 25 | 0.5 | Water |
| Example 6 | TM-6 | TPT | 3 | — | — | 25 | 1 | EG |
| Example 7 | TM-7 | TPT | 2 | Sodium hydroxide | 0.1 | 25 | 1 | EG |
| Example 8 | TM-8 | TPT | 2 | Lithium hydroxide | 0.2 | 25 | 1 | EG |
| Example 9 | TM-9 | TPT | 2 | TBAOH | 0.1 | 25 | 1 | EG |
| Example 10 | TM-10 | TPT | 2 | Potassium carbonate | 0.1 | 25 | 1 | EG |
| Example 11 | TM-11 | TPT | 2 | Lithium acetate | 0.95 | 25 | 1 | EG |
| Example 12 | TM-12 | TPT | 2 | Sodium acetate | 0.01 | 25 | 1 | EG |
| Example 13 | TM-13 | TPT | 2 | Triethylamine | 0.01 | 25 | 1 | EG |

TABLE 1-continued

| | Name of catalyst | Titanium compound | Molar ratio of mannitol/Ti | Base | Molar ratio of base/Ti | Reaction conditions in catalyst preparation Temperature (°C.) | Time (h) | Solvent |
|---|---|---|---|---|---|---|---|---|
| Example 14 | TM-14 | TBT | 2 | — | — | 60 | 0.5 | EG |
| Example 15 | TM-15 | TPT | 2 | Potassium hydroxide | 0.1 | 25 | 1 | EG |
| Example 16 | TM-16 | TPT | 2 | Sodium hydroxide *1 | 0.1 | 25 | 1 | EG |
| Comparative Example 1 | C-1 | TPT | 0 | — | — | 25 | 1 | EG |
| Comparative Example 2 | C-2 | TPT | 0 | — | — | 25 | 1 | Water |
| Comparative Example 3 | C-3 | TPT | 0.5 | — | — | 25 | 1 | EG |
| Comparative Example 4 | C-4 | TPT | 4 | Sodium hydroxide | 2 | 25 | 1 | EG |
| Comparative Example 5 | C-5 | TPT | 4 | Triethylamine | 2 | 25 | 1 | EG |
| Comparative Example 6 | C-6 | TPT | 4 | — | — | 100 | 1 | EG |
| Comparative Example 7 | C-7 | TPT | 2 (Sorbitol) | — | — | 25 | 1 | EG |
| Comparative Example 8 | C-8 | TPT | 2 (Mannose) | — | — | 25 | 1 | EG |
| Comparative Example 9 | C-9 | TPT | 2 (Pentaerythritol) | — | — | 25 | 1 | EG |
| Comparative Example 10 | C-10 | TPT | 2 (Glycerol) | — | — | 25 | 1 | EG |
| Comparative Example 11 | C-11 | TPT | 2 (Trimethylolpropane) | — | — | 25 | 1 | EG |

TMT: Titanium tetramethoxide
TET: Titanium tetraethoxide
TPT: Titanium tetraisopropoxide
TBT: Titanium tetrabutoxide
TBAOH: Tetrabutylammonium hydroxide
EG: Ethylene glycol
*1: Sodium hydroxide, which was a base compound, was added to a mannitol compound, and then TPT, which was a titanium compound, was added.

Example 17

To an esterification reaction vessel in which about 100 kg of bis(hydroxyethyl) terephthalate had been charged and which had been held at a temperature of 250° C. and a pressure of $1.2 \times 10^5$ Pa was feed a slurry of 82.5 kg of high purity terephthalic acid (produced by Mitsui Chemicals, Inc.) and 35.4 kg of ethylene glycols (produced by NIPPON SHOKUBAI Co., Ltd.) slowly over 4 hours, and an esterification reaction was performed over an additional one hour also after the completion of the feeding, and then 101.5 kg of the resulting esterification reaction product was transferred to a polycondensation vessel.

An ethylene glycol solution of magnesium acetate in an amount corresponding to 5 ppm in terms of magnesium atom relative to the polymer to be obtained, an ethylene glycol solution of cobalt acetate in an amount corresponding to 30 ppm in terms of cobalt atom relative to the polymer to be obtained, and tetrakis(2,4-di-tert-butyl-5-methylphenyl) [1,1-biphenyl]-4,4'-diylbisphosphonite (produced by OSAKI INDUSTRY Co., Ltd., GSY-P101) in an amount corresponding to 10 ppm in terms of phosphorus atom relative to the polymer to be obtained were mixed in advance in another mixing vessel 30 minutes before being added to the esterification reaction product and were stirred at normal temperature for 30 minutes, and the resulting mixture was added to the esterification reaction product. Five minutes thereafter, catalyst TM-1 in an amount corresponding to 5 ppm in terms of titanium atom relative to the polymer to be obtained was added and further 5 minutes later, an ethylene glycol slurry of titanium oxide particles in an amount of 0.3% by weight in terms of titanium oxide particles relative to the polymer to be obtained was added. And further 5 minutes later, the pressure of the reaction system was reduced, so that the reaction was started. The temperature in the reactor was increased from 250° C. to 290° C. slowly and the pressure was reduced to 40 Pa. Both a time to be required for reaching the final temperature and that to be required for reaching the final pressure were adjusted to 60 minutes. When a prescribed stirring torque was achieved, the reaction system was returned to normal pressure by nitrogen purge, so that the polycondensation reaction was stopped. Then, the product was discharged into a strand form and cut immediately, affording pellets of a polymer. The time taken from the start of the pressure reduction to the arrival at the prescribed stirring torque was 2 hours and 18 minutes. The resulting polymer was excellent in color tone and heat resistance.

Moreover, this polyester was vacuum dried at 150° C. for 12 hours, then fed to a spinning machine, subsequently melted with a melter of a spinning temperature of 285° C., and thereafter discharged through a spinneret with 16 holes of 0.18 mm in diameter and pulled at a rate of 1000 m/min, affording 300 dtex/36 filaments. In the melt spinning step, almost no deposition around the spinneret holes during spinning and almost no increase in filtering pressure were observed.

Examples 18 to 32

Polyesters were polymerized and subjected to melt-spinning in the same manner as in Example 17 except for changing the catalyst and the added amount of the catalyst as shown in Table 2. In Examples 27, 29, and 32, color tone and heat resistance were a little inferior but were on a satisfactory level as products. In the other Examples, the resulting polymers were excelled in both color tone and heat resistance. Moreover, almost no deposition around the spinneret holes during spinning and almost no increase in filtering pressure were observed.

Examples 33 to 41, and 47 to 49

Polyesters were polymerized and melt-spun in the same manner as in Example 17 except for changing the catalyst and the added amount of the catalyst, the kind and the added amount of a phosphorus compound as shown in Table 4. In Examples 33, 38, and 39, color tone was a little inferior, and in Examples 33, 35, 38, and 39, heat resistance was a little inferior but was on a satisfactory level as a product. In the other Examples, both color tone and heat resistance were good. Moreover, almost no deposition around the spinneret holes during spinning and almost no increase in filtering pressure were observed.

Examples 42 to 46

The added amount of cobalt was changed as shown in Table 4, and when magnesium, cobalt, and phosphorus was added to an esterification reaction product, a dye was subsequently added as a color tone adjusting agent as shown in Table 4. In the same manner as in Example 17 except for the foregoing, a polyester was polymerized and melt-spun. The color tone of all products were slightly low in L value and moreover Examples 44 to 45 were a little low in a value, but they were on satisfactory levels as products. In addition, heat resistance was good in every case. Moreover, almost no deposition around the spinneret holes during spinning and almost no increase in filtering pressure were observed.

TABLE 2

| | Catalyst/Additive | | | | | |
|---|---|---|---|---|---|---|
| | Titanium catalyst | | | Phosphorus compound | | Magnesium compound |
| | Kind | Ti content in PET (in terms of atom) [ppm] | Mannitol Content in PET [ppm] | Kind | Content (in terms of atom) [ppm] | Kind |
| Example 17 | TM-1 | 5 | 38 | Phosphorus compound 1 | 10 | Magnesium acetate | 5 |
| Example 18 | TM-2 | 5 | 38 | Phosphorus compound 1 | 10 | Magnesium acetate | 5 |
| Example 19 | TM-3 | 5 | 19 | Phosphorus compound 1 | 10 | Magnesium acetate | 5 |
| Example 20 | TM-4 | 5 | 38 | Phosphorus compound 1 | 10 | Magnesium acetate | 5 |
| Example 21 | TM-5 | 5 | 38 | Phosphorus compound 1 | 10 | Magnesium acetate | 5 |
| Example 22 | TM-6 | 4 | 46 | Phosphorus compound 1 | 10 | Magnesium acetate | 5 |
| Example 23 | TM-7 | 5 | 38 | Phosphorus compound 1 | 10 | Magnesium acetate | 5 |
| Example 24 | TM-8 | 5 | 38 | Phosphorus compound 1 | 10 | Magnesium acetate | 5 |
| Example 25 | TM-9 | 5 | 38 | Phosphorus compound 1 | 10 | Magnesium acetate | 5 |
| Example 26 | TM-10 | 5 | 38 | Phosphorus compound 1 | 10 | Magnesium acetate | 5 |
| Example 27 | TM-11 | 5 | 38 | Phosphorus compound 1 | 10 | Magnesium acetate | 5 |
| Example 28 | TM-12 | 5 | 38 | Phosphorus compound 1 | 10 | Magnesium acetate | 5 |
| Example 29 | TM-13 | 5 | 38 | Phosphorus compound 1 | 10 | Magnesium acetate | 5 |
| Example 30 | TM-14 | 5 | 38 | Phosphorus compound 1 | 10 | Magnesium acetate | 5 |
| Example 31 | TM-15 | 5 | 38 | Phosphorus compound 1 | 10 | Magnesium acetate | 5 |
| Example 32 | TM-16 | 5 | 38 | Phosphorus compound 1 | 10 | Magnesium acetate | 5 |

| | Catalyst/Additive | | | | | |
|---|---|---|---|---|---|---|
| | Cobalt compound | | Tone tone adjusting | | | |
| | Kind | Content (in terms of atom) [ppm] | Kind | Content [ppm] | Molar ratio of P/Ti | Polymerization time [min] |
| Example 17 | Cobalt acetate | 30 | — | — | 3.11 | 138 |
| Example 18 | Cobalt acetate | 30 | — | — | 3.11 | 141 |
| Example 19 | Cobalt acetate | 30 | — | — | 3.11 | 136 |
| Example 20 | Cobalt acetate | 30 | — | — | 3.11 | 132 |

TABLE 2-continued

|  |  |  |  |  |  |  |
|---|---|---|---|---|---|---|
| Example 21 | Cobalt acetate | 30 | — | — | 3.11 | 150 |
| Example 22 | Cobalt acetate | 30 | — | — | 3.11 | 130 |
| Example 23 | Cobalt acetate | 30 | — | — | 3.11 | 128 |
| Example 24 | Cobalt acetate | 30 | — | — | 3.11 | 125 |
| Example 25 | Cobalt acetate | 30 | — | — | 3.11 | 133 |
| Example 26 | Cobalt acetate | 30 | — | — | 3.11 | 140 |
| Example 27 | Cobalt acetate | 30 | — | — | 3.11 | 151 |
| Example 28 | Cobalt acetate | 30 | — | — | 3.11 | 134 |
| Example 29 | Cobalt acetate | 30 | — | — | 3.11 | 138 |
| Example 30 | Cobalt acetate | 30 | — | — | 3.11 | 135 |
| Example 31 | Cobalt acetate | 30 | — | — | 3.11 | 130 |
| Example 32 | Cobalt acetate | 30 | — | — | 3.11 | 134 |

Phosphorus compound 1: Tetrakis(2,4-di-tert-butyl-5-methylphenyl)[1,1-biphenyl]-4,4'-diylbisphosphonite (produced by OSAKI INDUSTRY Co., Ltd., GSY-P101)

TABLE 3

| | Polymer property | | | | | | | |
|---|---|---|---|---|---|---|---|---|
| | | Amount of carboxyl terminals | Color tone | | | DEG content | Acetaldehyde | Δb value | Deposit around a |
| | IV | (Eq/ton) | L value | a value | b value | [wt %] | content [ppm] | 290 | spinneret |
| Example 17 | 0.66 | 29.9 | 71 | −1.5 | −1.4 | 1.0 | 8 | 1.8 | ○ |
| Example 18 | 0.66 | 28.6 | 71 | −1.4 | −1.5 | 1.1 | 9 | 1.6 | ○ |
| Example 19 | 0.66 | 28.8 | 72 | −1.6 | −1.8 | 1.0 | 9 | 1.6 | ○ |
| Example 20 | 0.66 | 28.9 | 71 | −1.4 | −1.4 | 0.9 | 8 | 1.9 | ○ |
| Example 21 | 0.66 | 29.2 | 73 | −1.8 | −1.7 | 1.2 | 10 | 1.4 | ○ |
| Example 22 | 0.66 | 28.8 | 71 | −1.6 | −1.6 | 1.0 | 10 | 1.8 | ○ |
| Example 23 | 0.66 | 30.6 | 72 | −1.7 | −2.1 | 0.9 | 8 | 1.3 | ○ |
| Example 24 | 0.66 | 30.7 | 72 | −1.5 | −2.3 | 0.9 | 9 | 1.4 | ○ |
| Example 25 | 0.66 | 31.8 | 71 | −1.6 | −1.7 | 1.2 | 11 | 1.8 | ○ |
| Example 26 | 0.66 | 32.8 | 71 | −1.8 | −1.5 | 1.1 | 13 | 1.9 | ○ |
| Example 27 | 0.66 | 34.5 | 71 | −1.6 | 1.4 | 1.0 | 12 | 3.2 | ○ |
| Example 28 | 0.66 | 29.9 | 71 | −1.3 | −1.7 | 1.1 | 9 | 1.4 | ○ |
| Example 29 | 0.66 | 32.2 | 71 | −1.4 | 0.5 | 1.2 | 10 | 3.3 | ○ |
| Example 30 | 0.66 | 29.1 | 72 | −1.5 | −1.9 | 1.1 | 12 | 1.5 | ○ |
| Example 31 | 0.66 | 30.5 | 72 | −1.5 | −2.0 | 1.0 | 10 | 1.4 | ○ |
| Example 32 | 0.66 | 31.5 | 72 | −1.5 | 0.5 | 1.1 | 12 | 1.9 | ○ |

TABLE 4

| | Catalyst/Additive | | | | | |
|---|---|---|---|---|---|---|
| | Titanium catalyst | | | Phosphorus compound | | Magnesium compound | |
| | Kind | Ti content in PET (in terms of atom) [ppm] | Mannitol Content in PET [ppm] | Kind | Content (in terms of atom) [ppm] | Kind | Content (in terms of atom) [ppm] |
| Example 33 | TM-7 | 5 | 38 | — | — | Magnesium acetate | 5 |
| Example 34 | TM-7 | 5 | 38 | Phosphorus compound 1 | 50 | Magnesium acetate | 5 |
| Example 35 | TM-7 | 3 | 25 | Phosphorus compound 1 | 5 | Magnesium acetate | 5 |
| Example 36 | TM-3 | 13 | 49 | Phosphorus compound 1 | 50 | Magnesium acetate | 5 |
| Example 37 | TM-7 | 3 | 23 | Phosphorus compound 1 | 10 | Magnesium acetate | 5 |
| Example 38 | TM-3 | 10 | 38 | Phosphorus compound 1 | 10 | Magnesium acetate | 5 |

TABLE 4-continued

| | | | | | | | |
|---|---|---|---|---|---|---|---|
| Example 39 | TM-3 | 13 | 49 | Phosphorus compound 1 | 10 | Magnesium acetate | 5 |
| Example 40 | TM-7 | 5 | 38 | Phosphorus compound 2 | 10 | Magnesium acetate | 5 |
| Example 41 | TM-7 | 5 | 38 | Phosphorus compound 3 | 10 | Magnesium acetate | 5 |
| Example 42 | TM-7 | 5 | 38 | Phosphorus compound 1 | 10 | Magnesium acetate | 5 |
| Example 43 | TM-7 | 5 | 38 | Phosphorus compound 1 | 10 | Magnesium acetate | 5 |
| Example 44 | TM-7 | 5 | 38 | Phosphorus compound 1 | 10 | Magnesium acetate | 5 |
| Example 45 | TM-7 | 5 | 38 | Phosphorus compound 1 | 10 | Magnesium acetate | 5 |
| Example 46 | TM-7 | 5 | 38 | Phosphorus compound 1 | 10 | Magnesium acetate | 5 |
| Example 47 | TM-1 | 5 | 38 | Phosphorus compound 1 | 10 | — | — |
| Example 48 | TM-1 | 5 | 38 | Phosphorus compound 1 | 50 | Magnesium acetate | 5 |
| Example 49 | TM-1 | 5 | 38 | Phosphorus compound 1 | 50 | — | — |

| | Catalyst/Additive | | | | | |
|---|---|---|---|---|---|---|
| | Cobalt compound | | Tone tone adjusting agent | | | Polymerization |
| | Kind | Content (in terms of atom) [ppm] | Kind | Content [ppm] | Molar ratio of P/Ti | time [min] |
| Example 33 | Cobalt acetate | 30 | — | — | 0 | 118 |
| Example 34 | Cobalt acetate | 30 | — | — | 15.1 | 172 |
| Example 35 | Cobalt acetate | 30 | — | — | 2.57 | 133 |
| Example 36 | Cobalt acetate | 30 | — | — | 5.96 | 161 |
| Example 37 | Cobalt acetate | 30 | — | — | 5.33 | 163 |
| Example 38 | Cobalt acetate | 30 | — | — | 1.52 | 120 |
| Example 39 | Cobalt acetate | 30 | — | — | 1.15 | 109 |
| Example 40 | Cobalt acetate | 30 | — | — | 3.11 | 128 |
| Example 41 | Cobalt acetate | 30 | — | — | 3.11 | 125 |
| Example 42 | — | — | SOLVENT BLUE 104 | 3 | 3.11 | 139 |
| Example 43 | Cobalt acetate | 5 | SOLVENT BLUE 104 | 1 | 3.11 | 132 |
| Example 44 | — | — | SOLVENT BLUE 104/SOLVENT RED 135 | 5/5 | 3.11 | 143 |
| Example 45 | — | — | SOLVENT BLUE 104/SOLVENT RED 135 | 3/2 | 3.11 | 145 |
| Example 46 | — | — | SOLVENT BLUE 104/SOLVENT RED 135 | 2/1 | 3.11 | 148 |
| Example 47 | Cobalt acetate | 30 | — | — | 3.11 | 155 |
| Example 48 | — | — | — | — | 3.11 | 150 |
| Example 49 | — | — | — | — | 3.11 | 170 |

Phosphorus compound 1: Tetrakis(2,4-di-tert-butyl-5-methylphenyl)(1,1-biphenyl)-4,4'-diylbisphosphonite (produced by OSAKI INDUSTRY Co., Ltd., GST-P101)
Phosphorus compound 2: Tetrakis(2,4-di-tert-butylphenyl)[1,1-biphenyl]-4,4'-diylbisphosphonite (produced by Clba Specialty Chemicals. IRGAFOS P-EPQ)
Phosphorus compound 3: 3,9-Bis(2,5-di-tert-butyl-4-methylphenyl)-2,4,8,10-tetraoxa-3,8-diphosphaspiro[5,5]undecane (produced by Adeka Corporation, PEP-36)

TABLE 5

| | Polymer property | | | | | | | |
|---|---|---|---|---|---|---|---|---|
| | | Amount of carboxyl terminals | Color tone | | | DEG content | Acetaldehyde | | Deposit around a |
| | IV | (Eq/ton) | L value | a value | b value | [wt %] | content [ppm] | Δb value 290 | spinneret |
| Example 33 | 0.66 | 34.6 | 73 | −3.5 | 1.0 | 1.1 | 15 | 2.5 | ○ |
| Example 34 | 0.66 | 29.2 | 71 | −1.1 | −1.6 | 1.0 | 10 | 1.2 | ○ |
| Example 35 | 0.66 | 28.4 | 72 | −2.2 | −0.1 | 1.1 | 11 | 2.9 | ○ |
| Example 36 | 0.66 | 33.7 | 71 | −1.1 | −2.2 | 1.5 | 13 | 1.3 | ○ |
| Example 37 | 0.66 | 29.0 | 72 | −1.5 | −2.1 | 1.2 | 8 | 1.2 | ○ |

TABLE 5-continued

| | | Polymer property | | | | | | | |
|---|---|---|---|---|---|---|---|---|---|
| | | Amount of carboxyl terminals | Color tone | | | DEG content | Acetaldehyde | | Deposit around a |
| | IV | (Eq/ton) | L value | a value | b value | [wt %] | content [ppm] | Δb value 290 | spinneret |
| Example 38 | 0.66 | 34.1 | 72 | −1.5 | 1.0 | 1.4 | 12 | 3.1 | ○ |
| Example 39 | 0.66 | 34.2 | 71 | −1.6 | 1.5 | 1.5 | 13 | 3.0 | ○ |
| Example 40 | 0.66 | 30.1 | 71 | −1.6 | −1.5 | 1.1 | 10 | 1.2 | ○ |
| Example 41 | 0.66 | 29.9 | 71 | −1.5 | −1.7 | 1.0 | 11 | 1.3 | ○ |
| Example 42 | 0.66 | 30.6 | 68 | −2.5 | −1.6 | 1.3 | 11 | 1.5 | ○ |
| Example 43 | 0.66 | 29.3 | 70 | −2.3 | −1.5 | 1.1 | 9 | 1.4 | ○ |
| Example 44 | 0.66 | 31.1 | 66 | −3.5 | −5.8 | 1.2 | 11 | 1.5 | ○ |
| Example 45 | 0.66 | 30.2 | 68 | −2.5 | −4.7 | 1.2 | 10 | 1.4 | ○ |
| Example 46 | 0.66 | 30.1 | 69 | −2.0 | −4.0 | 1.0 | 10 | 1.5 | ○ |
| Example 47 | 0.66 | 32.0 | 71 | −3.5 | −5.8 | 1.1 | 11 | 1.5 | ○ |
| Example 48 | 0.66 | 28.6 | 72 | −1.4 | −2.1 | 1.0 | 10 | 1.2 | ○ |
| Example 49 | 0.66 | 32.1 | 71 | −1.3 | −1.8 | 1.0 | 9 | 1.0 | ○ |

Comparative Examples 12 to 22

Polyesters were polymerized and subjected to melt-spinning in the same manner as in Example 17 except for changing the catalyst as shown in Table 6. In Comparative Example 13, a prescribed stirring torque was not achieved. In Comparative Example 15, the time taken until a prescribed stirring torque was achieved became remarkably long. All the polymers were rich yellow in color tone and were rich in acetaldehyde and they were large in Δb value 290, so that they were polymers inferior in heat resistance.

Comparative Examples 23, 27, and 29

Polyesters were polymerized and melt-spun in the same manner as in Example 17 except for changing the catalyst as shown in Table 6, changing the added amounts of a phosphorus compound, magnesium acetate, and cobalt acetate, and adding a color tone adjusting agent (SOLVENT BLUE 104). As to the color tone of the polymers, the b values were good but the L values were a little low. The polymers contained high contents of acetaldehyde and they were large in Δb value 290, so that they were polymers inferior in heat resistance.

Comparative Example 24

A polyester was polymerized and melt-spun in the same manner as in Example 17 except for using C-1 as a catalyst and adding mannitol aside from the catalyst to the polymerization system so that the molar ratio mannitol/Ti would become 2. The polymer was rich yellow in color tone and was rich in acetaldehyde and it was large in Δb value 290, so that it was a polymer inferior in heat resistance.

Comparative Examples 25 and 26

Polyesters were polymerized in the same manner as in Example 17 except for changing the phosphorus compound as shown in Table 6, but the stirring torque reached a prescribed value in neither of the cases.

Comparative Example 28

A polyester was polymerized and melt-spun in the same manner as in Example 17 except for changing the catalyst as shown in Table 6, failing to add magnesium acetate, and increasing the added amount of cobalt acetate. As to the color tone of the polymer, the b value was good but the L value was a little low. The polymer contained a high content of acetaldehyde and was very large in Δb value 290, so that it was a polymer inferior in heat resistance.

Comparative Example 30

A polyester was polymerized and melt-spun in the same manner as in Example 17 except for adding antimony oxide, which was an antimony compound, instead of the titanium compound and increasing the added amount of a phosphorus compound. A little long time was taken until reaching a prescribed stirring torque. It was a polymer satisfactory in polymer color tone and heat resistance, but a deposit was found around spinneret holes in melt spinning, and increase in filtering pressure and filament breakage occurred.

TABLE 6

| | Catalyst/Additive | | | | | | |
|---|---|---|---|---|---|---|---|
| | Titanium catalyst | | | | | Magnesium compound | |
| | | Titanium catalyst (antimony compound in Comparative Example 30 only) | Mannitol Content in PET | Phosphorus compound | | | |
| | Kind | | [ppm] | | Content (in terms of stom) [ppm] | Kind | Content (in terms of atom) [ppm] |
| Comparative Example 12 | C-1 | 5 | 0 | Phosphorus compound 1 | 10 | Magnesium acetate | 5 |
| Comparative Example 13 | C-2 | 5 | 0 | Phosphorus compound 1 | 10 | Magnesium acetate | 5 |

TABLE 6-continued

| | | | | | | | |
|---|---|---|---|---|---|---|---|
| Comparative Example 14 | C-3 | 5 | 10 | Phosphorus compound 1 | 10 | Magnesium acetate | 5 |
| Comparative Example 15 | C-4 | 5 | 76 | Phosphorus compound 1 | 10 | Magnesium acetate | 5 |
| Comparative Example 16 | C-5 | 5 | 76 | Phosphorus compound 1 | 10 | Magnesium acetate | 5 |
| Comparative Example 17 | C-6 | 5 | 76 | Phosphorus compound 1 | 10 | Magnesium acetate | 5 |
| Comparative Example 18 | C-7 | 5 | 0 | Phosphorus compound 1 | 10 | Magnesium acetate | 5 |
| Comparative Example 19 | C-8 | 5 | 0 | Phosphorus compound 1 | 10 | Magnesium acetate | 5 |
| Comparative Example 20 | C-9 | 5 | 0 | Phosphorus compound 1 | 10 | Magnesium acetate | 5 |
| Comparative Example 21 | C-10 | 5 | 0 | Phosphorus compound 1 | 10 | Magnesium acetate | 5 |
| Comparative Example 22 | C-11 | 5 | 0 | Phosphorus compound 1 | 10 | Magnesium acetate | 5 |
| Comparative Example 23 | C-1 | 5 | 0 | Phosphorus compound 1 | 10 | Magnesium acetate | 15 |
| Comparative Example 24 | C-1 | 5 | 38*2 | Phosphorus compound 1 | 10 | Magnesium acetate | 5 |
| Comparative Example 25 | C-1 | 5 | 0 | Phosphoric acid | 10 | Magnesium acetate | 5 |
| Comparative Example 26 | C-1 | 5 | 0 | Ethyl diethylphosphonoacetats | 10 | Magnesium acetate | 5 |
| Comparative Example 27 | C-7 | 5 | 0 | Phosphorus compound 1 | 10 | — | — |
| Comparative Example 28 | C-7 | 5 | 0 | Phosphorus compound 1 | 10 | — | — |
| Comparative Example 29 | C-7 | 5 | 0 | — | — | Magnesium acetate | 50 |
| Comparative Example 30 | Antimony oxide | 250 | 0 | Phosphorus compound 1 | 15 | Magnesium acetate | 5 |

| | Catalyst/Additive | | | | | |
|---|---|---|---|---|---|---|
| | Cobalt compound | | Tone tone adjusting agent | | | |
| | Kind | Content (in terms of atom) [ppm] | Kind | Content [ppm] | Molar ratio of P/Ti | Polymerization time [min] |
| Comparative Example 12 | Cobalt acetate | 30 | — | — | 3.11 | 135 |
| Comparative Example 13 | Cobalt acetate | 30 | — | — | 3.11 | *1 |
| Comparative Example 14 | Cobalt acetate | 30 | — | — | 3.11 | 130 |
| Comparative Example 15 | Cobalt acetate | 30 | — | — | 3.11 | 210 |
| Comparative Example 16 | Cobalt acetate | 30 | — | — | 3.11 | 153 |
| Comparative Example 17 | Cobalt acetate | 30 | — | — | 3.11 | 158 |
| Comparative Example 18 | Cobalt acetate | 30 | — | — | 3.11 | 155 |
| Comparative Example 19 | Cobalt acetate | 30 | — | — | 3.11 | 153 |
| Comparative Example 20 | Cobalt acetate | 30 | — | — | 3.11 | 152 |
| Comparative Example 21 | Cobalt acetate | 30 | — | — | 3.11 | 165 |
| Comparative Example 22 | Cobalt acetate | 30 | — | — | 3.11 | 160 |
| Comparative Example 23 | — | — | SOLVENT BLUE 104 | 3 | 3.11 | 158 |
| Comparative Example 24 | Cobalt acetate | 30 | — | — | 3.11 | 139 |
| Comparative Example 25 | Cobalt acetate | 30 | — | — | 3.11 | *1 |
| Comparative Example 26 | Cobalt acetate | 30 | — | — | 3.11 | *1 |
| Comparative Example 27 | — | — | SOLVENT BLUE 104 | 3 | 3.11 | 168 |

TABLE 6-continued

|  | | | | | | |
|---|---|---|---|---|---|---|
| Comparative Example 28 | Cobalt acetate | 100 | — | — | 3.11 | 129 |
| Comparative Example 29 | — | — | SOLVENT BLUE 104 | 5 | — | 123 |
| Comparative Example 30 | Cobalt acetate | 30 | — | — | — | 158 |

*1: A polymerization reaction did not proceed to a prescribed intrinsic viscoity.
*2Mannitol was added a side from a catalyst.

TABLE 7

| | Polymer property | | | | | | | |
|---|---|---|---|---|---|---|---|---|
| | | Amount of carboxyl terminals | Color tone | | | DEG content | Acetaldehyde content | Δb value | Deposit around a |
| | IV | (Eq/ton) | L value | a value | b value | [wt %] | [ppm] | 290 | spinneret |
| Comparative Example 12 | 0.66 | 41.2 | 73 | −3.6 | 8.1 | 1.8 | 16 | 7.1 | ○ |
| Comparative Example 13 | — | — | — | — | — | — | — | — | — |
| Comparative Example 14 | 0.66 | 33.2 | 74 | −3.2 | 7.0 | 1.7 | 15 | 6.9 | ○ |
| Comparative Example 15 | 0.66 | 40.2 | 73 | −3.1 | 6.5 | 1.5 | 17 | 5.1 | ○ |
| Comparative Example 16 | 0.66 | 42.5 | 73 | −3.3 | 6.3 | 1.5 | 17 | 5.3 | ○ |
| Comparative Example 17 | 0.66 | 31.4 | 74 | −3.2 | 7.1 | 1.5 | 15 | 6.5 | ○ |
| Comparative Example 18 | 0.66 | 38.1 | 73 | −3.1 | 4.1 | 1.8 | 19 | 8.1 | ○ |
| Comparative Example 19 | 0.66 | 39.2 | 72 | −3.0 | 4.4 | 1.7 | 18 | 7.8 | ○ |
| Comparative Example 20 | 0.66 | 33.7 | 72 | −3.1 | 3.5 | 1.8 | 20 | 7.3 | ○ |
| Comparative Example 21 | 0.66 | 37.6 | 72 | −3.1 | 4.9 | 1.6 | 22 | 7.0 | ○ |
| Comparative Example 22 | 0.66 | 39.8 | 72 | −3.0 | 4.2 | 1.8 | 20 | 6.5 | ○ |
| Comparative Example 23 | 0.66 | 41.4 | 69 | −2.3 | 1.8 | 1.5 | 21 | 5.2 | ○ |
| Comparative Example 24 | 0.66 | 39.1 | 75 | −3.3 | 7.9 | 1.8 | 22 | 6.3 | ○ |
| Comparative Example 25 | — | — | — | — | — | — | — | — | — |
| Comparative Example 26 | — | — | — | — | — | — | — | — | — |
| Comparative Example 27 | 0.66 | 30.4 | 68 | −2.3 | 1.9 | 1.4 | 19 | 4.3 | ○ |
| Comparative Example 28 | 0.66 | 42.8 | 69 | −1.8 | 1.9 | 1.8 | 20 | 8.1 | ○ |
| Comparative Example 29 | 0.66 | 33.3 | 68 | −2.4 | 1.8 | 1.7 | 21 | 6.2 | ○ |
| Comparative Example 30 | 0.66 | 35.1 | 72 | −2.6 | 0.8 | 1.6 | 18 | 1.1 | X |

Example 50

To an esterification reaction vessel in which catalyst TM-1 in an amount corresponding to 5 ppm in terms of titanium atom relative to the polymer to be obtained and 100 kg of bis(hydroxyethyl) terephthalate had been charged and which has been held at a temperature of 250° C. and a pressure of $1.2 \times 10^5$ Pa, a slurry of 82.5 kg of high purity terephthalic acid (produced by Mitsui Chemicals, Inc.) and 35.4 kg of ethylene glycol (produced by Nippon Shokubai Co., Ltd.) was fed slowly over three hours. After the completion of the feeding, an esterification reaction was performed until the temperature of a distillate became lower than 90° C. The esterification reaction time was 3 hours and 39 minutes in total. The resulting esterification reaction product (101.5 kg) was transferred to a polycondensation vessel.

An ethylene glycol solution of magnesium acetate (produced by Wako Pure Chemical Industries, Ltd.) in an amount corresponding to 5 ppm in terms of magnesium atom relative to the polymer to be obtained and tetrakis(2,4-di-tert-butyl-5-methylphenyl) [1,1-biphenyl]-4,4'-diylbisphosphonite (produced by OSAKI INDUSTRY Co., Ltd., GSY-P101) in an amount corresponding to 10 ppm in terms of phosphorus atom relative to the polymer to be obtained were mixed in advance in another mixing vessel 30 minutes before being added to the esterification reaction product and were stirred at normal temperature for 30 minutes, and the resulting mixture was added to the esterification reaction product. Five minutes later, an ethylene glycol slurry of titanium oxide particles was added in an amount of 0.3% by weight in terms of titanium oxide particles relative to the polymer to be obtained. And further 5 minutes later, the pressure of the reaction system was reduced, so that the reaction was started. The temperature in the reactor was increased from 250° C. to 290° C. slowly and the pressure was reduced to 40 Pa. Both a time to be required for reaching the final temperature and that to be required for reaching the final pressure were adjusted to 60 minutes. When a prescribed stirring torque was achieved, the reaction system was returned to normal pressure by nitrogen purge, so that the polycondensation reaction was stopped. Then, the product was discharged into a strand form and cut immediately, affording pellets of a polymer. The time taken from the start of the pressure reduction to the arrival at the prescribed stirring torque was 2 hours and 20 minutes. The resulting polymer was excellent in color tone and heat resistance.

Moreover, this polyester was vacuum dried at 150° C. for 12 hours, then fed to a spinning machine, subsequently melted with a melter of a spinning temperature of 285° C., and thereafter discharged through a spinneret with 16 holes of 0.18 mm in diameter and pulled at a rate of 1000 m/min, affording 300 dtex/36 filaments. In the melt spinning step, almost no deposition around the spinneret holes during spinning and almost no increase in filtering pressure were observed.

Examples 51 to 65

Polyesters were polymerized and subjected to melt-spinning in the same manner as in Example 50 except for changing the catalyst and the added amount of the catalyst as shown in Table 8. The esterification reaction time and the polycondensation reaction time delayed a little in Example 60 and the color tone was a little inferior in Examples 62 and 65, but they were on satisfactory levels as products. The resulting polymers were excellent in both color tone and heat resistance. Moreover, almost no deposition around the spinneret holes during spinning and almost no increase in filtering pressure were observed.

Examples 66 to 75

Polyesters were polymerized and melt-spun in the same manner as in Example 50 except for changing the catalyst and the added amount of the catalyst, the kind and the added amount of a phosphorus compound, and the added amount of the magnesium compound as shown in Table 10. In Examples 66, 72, and 73, color tone was a little inferior but they were on satisfactory levels as products. In the other Examples, both color tone and heat resistance were good. Moreover, almost no deposition around the spinneret holes during spinning and almost no increase in filtering pressure were observed.

Examples 76 to 80

When magnesium and phosphorus were added to an esterification reaction product, a dye was added subsequently as a color tone adjusting agent as shown in Table 10. In the same manner as in Example 50 except for the foregoing, a polyester was polymerized and melt-spun. The color tone of all products were low in L value and moreover the a value was a little high in Examples 78 to 80, but they were on satisfactory levels as products. In addition, heat resistance was good in every case. Moreover, almost no deposition around the spinneret holes during spinning and almost no increase in filtering pressure were observed.

Example 81

In an esterification reaction vessel in which catalyst TM-7 in an amount corresponding to 5 ppm in terms of titanium atom relative to the polymer to be obtained, 82.5 kg of high purity terephthalic acid, and 49.1 kg of 1,3-propanediol (produced by DuPont) had been charged and which has been held at a temperature of 245° C. and a pressure of $1.2 \times 10^5$ Pa, an esterification reaction was performed until the temperature of a distillate became lower than 90° C. The esterification reaction time was 3 hours and 37 minutes in total. The resulting esterification reaction product (140 kg) was transferred to a polycondensation vessel.

A 1,3-propanediol solution of magnesium acetate in an amount of corresponding to 5 ppm in terms of magnesium atom relative to the polymer to be obtained and tetrakis(2,4-di-tert-butyl-5-methylphenyl) [1,1-biphenyl]-4,4'-diylbisphosphonite in an amount of corresponding to 10 ppm in terms of phosphorus atom relative to the polymer to be obtained were mixed in advance in another mixing vessel 30 minutes before being added to the esterification reaction product and were stirred at normal temperature for 30 minutes, and the resulting mixture was added to the esterification reaction product. Five minutes later, a 1,3-propanediol slurry of titanium oxide particles was added in an amount of 0.3% by weight in terms of titanium oxide particles relative to the polymer to be obtained. And further 5 minutes later, the pressure of the reaction system was reduced, so that the reaction was started. The temperature in the reactor was increased from 250° C. to 290° C. slowly and the pressure was reduced to 40 Pa. Both a time to be required for reaching the final temperature and that to be required for reaching the final pressure were adjusted to 60 minutes. When a prescribed stirring torque was achieved, the reaction system was returned to normal pressure by nitrogen purge, so that the polycondensation reaction was stopped. Then, the product was discharged into a strand form and cut immediately, affording pellets of a polymer. The time taken from the start of the pressure reduction to the arrival at the prescribed stirring torque was 2 hours and 9 minutes. The resulting polymer was excellent in color tone and heat resistance.

Moreover, this polyester was vacuum dried at 150° C. for 12 hours, then fed to a spinning machine, subsequently melted with a melter of a spinning temperature of 265° C., and thereafter discharged through a spinneret with 24 holes of 0.3 mm in diameter and pulled at a rate of 750 m/min, affording undrawn filaments. The resulting undrawn filaments were stretched by a hot roll stretching machine at 55° C. on 1 HR, 80° C. on 2 HR, and 140° C. on 3 HR in an overall stretching ratio of 4.0 times, affording 75 dtex/24 filaments. The resulting polymer was satisfactory in both color tone and heat resistance. Moreover, almost no deposition around the spinneret holes during spinning and almost no increase in filtering pressure were observed.

Example 82

In an esterification reaction vessel in which catalyst TM-7 in an amount corresponding to 5 ppm in terms of titanium atom relative to the polymer to be obtained, 82.5 kg of high purity terephthalic acid, and 89.5 kg of 1,4-butanediol (produced by BASF) had been charged and which has been held at a temperature of 250° C. and a pressure of $1.2 \times 10^5$ Pa, an esterification reaction was performed until the temperature of a distillate became lower than 90° C. The esterification reaction time was 3 hours and 40 minutes in total. The resulting esterification reaction product (135 kg) was transferred to a polycondensation vessel.

A 1,4-butanediol solution of magnesium acetate in an amount of corresponding to 5 ppm in terms of magnesium atom relative to the polymer to be obtained and tetrakis(2,4- di-tert-butyl-5-methylphenyl) [1,1-biphenyl]-4,4'-diylbisphosphonite in an amount of corresponding to 10 ppm in terms of phosphorus atom relative to the polymer to be obtained were mixed in advance in another mixing vessel 30 minutes before being added to the esterification reaction product and were stirred at normal temperature for 30 minutes, and the resulting mixture was added to the esterification reaction product. Five minutes later, a 1,4-butanediol slurry of titanium oxide particles was added in an amount of 0.3% by weight in terms of titanium oxide particles relative to the polymer to be obtained. And further 5 minutes later, the pressure of the reaction system was reduced, so that the reaction was started. The temperature in the reactor was increased from 190° C. to 250° C. slowly and the pressure was reduced to 60 Pa. Both a time to be required for reaching the final temperature and that to be required for reaching the final pressure were adjusted to 60 minutes. When a prescribed stirring torque was achieved, the reaction system was returned to normal pressure by nitrogen purge, so that the polycondensation reaction was stopped. Then, the product was discharged into a strand form and cut immediately, affording pellets of a polymer. The time taken from the start of the pressure reduction to the arrival at the prescribed stirring torque was 2 hours and 14 minutes. The resulting polymer was excellent in color tone and heat resistance.

Moreover, this polyester was vacuum dried at 150° C. for 12 hours, then fed to a spinning machine, subsequently melted with a melter of a spinning temperature of 250° C., and thereafter discharged through a spinneret with 24 holes of 0.3 mm in diameter and pulled at a rate of 2730 m/min, affording 108.4 dtex/36 filaments. Almost no deposition around the spinneret holes during spinning and almost no increase in filtering pressure were observed.

TABLE 8

| | Catalyst/Additive | | | | | | | | | | |
|---|---|---|---|---|---|---|---|---|---|---|---|
| | Titanium catalyst | | | Phosphorus compound | | Magnesium compound | | Tone tone adjusting | | Molar ratio of P/Ti | Esterification reaction time [min] | Polymerization time [min] |
| | Kind | Ti added content in PET (in terms of atom) [ppm] | Mannitol Added content in PET [ppm] | Kind | Added content (in terms of atom) [ppm] | Kind | Added content (in terms of atom) [ppm] | Kind | Added content [ppm] | | | |
| Example 50 | TM-1 | 5 | 38 | Phosphorus compound 1 | 10 | Magnesium acetate | 5 | — | — | 3.11 | 219 | 140 |
| Example 51 | TM-2 | 5 | 38 | Phosphorus compound 1 | 10 | Magnesium acetate | 5 | — | — | 3.11 | 220 | 142 |
| Example 52 | TM-3 | 5 | 19 | Phosphorus compound 1 | 10 | Magnesium acetate | 5 | — | — | 3.11 | 227 | 149 |
| Example 53 | TM-4 | 5 | 38 | Phosphorus compound 1 | 10 | Magnesium acetate | 5 | — | — | 3.11 | 210 | 132 |
| Example 54 | TM-5 | 5 | 38 | Phosphorus compound 1 | 10 | Magnesium acetate | 5 | — | — | 3.11 | 237 | 149 |
| Example 55 | TM-6 | 4 | 46 | Phosphorus compound 1 | 10 | Magnesium acetate | 5 | — | — | 3.89 | 215 | 136 |
| Example 56 | TM-7 | 5 | 38 | Phosphorus compound 1 | 10 | Magnesium acetate | 5 | — | — | 3.11 | 226 | 129 |
| Example 57 | TM-8 | 5 | 38 | Phosphorus compound 1 | 10 | Magnesium acetate | 5 | — | — | 3.11 | 228 | 148 |
| Example 58 | TM-9 | 5 | 38 | Phosphorus compound 1 | 10 | Magnesium acetate | 5 | — | — | 3.11 | 222 | 143 |
| Example 59 | TM-10 | 5 | 38 | Phosphorus compound 1 | 10 | Magnesium acetate | 5 | — | — | 3.11 | 240 | 156 |
| Example 60 | TM-11 | 5 | 38 | Phosphorus compound 1 | 10 | Magnesium acetate | 5 | — | — | 3.11 | 260 | 168 |
| Example 61 | TM-12 | 5 | 38 | Phosphorus compound 1 | 10 | Magnesium acetate | 5 | — | — | 3.11 | 230 | 144 |
| Example 62 | TM-13 | 5 | 38 | Phosphorus compound 1 | 10 | Magnesium acetate | 5 | — | — | 3.11 | 222 | 145 |
| Example 63 | TM-14 | 5 | 38 | Phosphorus compound 1 | 10 | Magnesium acetate | 5 | — | — | 3.11 | 232 | 146 |
| Example 64 | TM-15 | 5 | 38 | Phosphorus compound 1 | 10 | Magnesium acetate | 5 | — | — | 3.11 | 231 | 142 |
| Example 65 | TM-16 | 5 | 38 | Phosphorus compound 1 | 10 | Magnesium acetate | 5 | — | — | 3.11 | 230 | 150 |

Phosphorus compound 1: Tetrakis(2,4-di-tert-butyl 5-methylphenyl)[1,1-biphenyl]-4,4'-diylbisphosphonite (produced by OSAKI INDUSTRY Co., Ltd., GSY-P101)

TABLE 9

| | Polymer property | | | | | | | |
|---|---|---|---|---|---|---|---|---|
| | | Amount of carboxyl terminals | Color tone | | | DEG content | Acetaldehyde content | Δb value | Deposit around a |
| | IV | (Eq/ton) | L value | a value | b value | [wt %] | [ppm] | 290 | spinneret |
| Example 50 | 0.66 | 31.4 | 71 | −1.6 | −0.4 | 1.0 | 10 | 1.5 | ○ |
| Example 51 | 0.66 | 31.5 | 73 | −1.5 | −0.3 | 1.1 | 9 | 1.2 | ○ |
| Example 52 | 0.66 | 31.9 | 72 | −1.6 | −1.4 | 1.0 | 9 | 1.9 | ○ |
| Example 53 | 0.66 | 30.8 | 72 | −1.4 | −1.2 | 1.0 | 9 | 1.0 | ○ |
| Example 54 | 0.66 | 31.0 | 72 | −1.9 | −0.1 | 1.2 | 8 | 1.5 | ○ |
| Example 55 | 0.66 | 30.1 | 73 | −1.4 | −1.4 | 1.0 | 9 | 1.1 | ○ |
| Example 56 | 0.66 | 30.3 | 71 | −1.5 | −1.2 | 1.0 | 9 | 1.4 | ○ |
| Example 57 | 0.66 | 31.4 | 71 | −1.9 | −1.7 | 1.0 | 11 | 1.9 | ○ |
| Example 58 | 0.66 | 34.2 | 73 | −1.6 | −1.5 | 1.1 | 9 | 1.1 | ○ |
| Example 59 | 0.66 | 33.3 | 72 | −1.7 | −1.4 | 1.1 | 14 | 1.8 | ○ |
| Example 60 | 0.66 | 29.4 | 71 | −1.2 | −1.8 | 0.8 | 9 | 1.0 | ○ |
| Example 61 | 0.66 | 32.1 | 71 | −1.7 | −0.2 | 1.0 | 10 | 1.4 | ○ |
| Example 62 | 0.66 | 30.1 | 72 | −1.5 | 0.2 | 1.1 | 12 | 1.7 | ○ |
| Example 63 | 0.66 | 31.5 | 71 | −1.4 | −1.7 | 1.2 | 13 | 1.5 | ○ |
| Example 64 | 0.66 | 32.4 | 72 | −1.8 | −1.9 | 1.1 | 13 | 1.9 | ○ |
| Example 65 | 0.66 | 32.0 | 72 | −1.6 | 0.3 | 1.2 | 12 | 1.8 | ○ |

TABLE 10

| | Catalyst/Additive | | | | | | | | | | | |
|---|---|---|---|---|---|---|---|---|---|---|---|---|
| | Titanium catalyst | | | Phosphorus compound | | Magnesium compound | | Tone tone adjusting agent | | | Esterification | Polymerization |
| | Kind | Ti added content in PET (in terms of atom) [ppm] | Mannitol Added content in PET [ppm] | Kind | Added content (in terms of atom) [ppm] | Kind | Added content (in terms of atom) [ppm] | Kind | Added content [ppm] | Molar ratio of P/Ti | reaction time [min] | time [min] |
| Example 66 | TM-7 | 5 | 38 | — | — | Magnesium acetate | 5 | — | — | 0 | 213 | 130 |
| Example 67 | TM-7 | 5 | 38 | Phosphorurs compound 1 | 50 | — | — | — | — | 15.6 | 253 | 184 |
| Example 68 | TM-7 | 5 | 38 | Phosphorus compound 1 | 50 | Magnesium acetate | 5 | — | — | 15.6 | 248 | 156 |
| Example 69 | TM-7 | 3 | 23 | Phosphorus compound 1 | 5 | Magnesium acetate | 5 | — | — | 2.67 | 228 | 143 |
| Example 70 | TM-3 | 13 | 49 | Phosphorus compound 1 | 50 | Magnesium acetate | 5 | — | — | 5.98 | 223 | 142 |
| Example 71 | TM-7 | 3 | 23 | Phosphorus compound 1 | 10 | Magnesium acetate | 5 | — | — | 5.18 | 249 | 162 |
| Example 72 | TM-3 | 10 | 38 | Phosphorus compound 1 | 10 | Magnesium acetate | 5 | — | — | 1.52 | 209 | 122 |
| Example 73 | TM-3 | 13 | 49 | Phosphorus compound 1 | 10 | Magnesium acetate | 5 | — | — | 1.19 | 202 | 118 |
| Example 74 | TM-7 | 5 | 38 | Phosphorus compound 2 | 10 | Magnesium acetate | 5 | — | — | 3.11 | 210 | 148 |
| Example 75 | TM-7 | 5 | 38 | Phosphorus compound 3 | 10 | Magnesium acetate | 5 | — | — | 3.11 | 215 | 145 |
| Example 76 | TM-7 | 5 | 38 | Phosphorus compound 1 | 10 | Magnesium acetate | 5 | SOLVENT BLUE 104 | 3 | 3.11 | 215 | 140 |
| Example 77 | TM-7 | 5 | 38 | Phosphorus compound 1 | 10 | Magnesium acetate | 5 | SOLVENT BLUE 104 | 1 | 3.11 | 224 | 145 |
| Example 78 | TM-7 | 5 | 38 | Phosphorus compound 1 | 10 | Magnesium acetate | 5 | SOLVENT BLUE 104/ SOLVENT RED 135 | 5/5 | 3.11 | 216 | 142 |
| Example 79 | TM-7 | 5 | 38 | Phosphorus compound 1 | 10 | Magnesium acetate | 5 | SOLVENT BLUE 104/ SOLVENT RED 135 | 3/2 | 3.11 | 218 | 142 |

TABLE 10-continued

| | Catalyst/Additive | | | | | | | | | | |
|---|---|---|---|---|---|---|---|---|---|---|---|
| | Titanium catalyst | | | Phosphorus compound | | Magnesium compound | | Tone tone adjusting agent | | Esterification | Polymerization |
| | Kind | Ti added content in PET (in terms of atom) [ppm] | Mannitol Added content in PET [ppm] | Kind | Added content (in terms of atom) [ppm] | Kind | Added content (in terms of atom) [ppm] | Kind | Added content [ppm] | Molar ratio of P/Ti | reaction time [min] | ization time [min] |
| Example 80 | TM-7 | 5 | 38 | Phosphorus compound 1 | 10 | Magnesium acetate | 5 | SOLVENT BLUE 104/ SOLVENT RED 135 | 2/1 | 3.11 | 220 | 147 |
| Example 81 | TM-7 | 5 | 38 | Phosphorus compound 1 | 50 | Magnesium acetate | 5 | — | — | 15.6 | 217 | 129 |
| Example 82 | TM-7 | 5 | 38 | Phosphorus compound 1 | 50 | Magnesium acetate | 5 | — | — | 15.6 | 220 | 134 |

Phosphorus compound 1: Tetrakis(2,4-di-tert-butyl-5-methylphenyl)[1,1-biphenyl]-4,4'-diylbisphosphonite (produced by OSAKI INDUSTRY Co., Ltd., GSY-P101)
Phosphorus compound 2: Tetrakis(2,4-di-tert-butylphenyl)[1,1-biphenyl]-4,4'-diylbisphosphonite (produced by Ciba Specialty Chemicals, IRGAFOS P-EPQ)
Phosphorus compound 3: 3,9-Bis(2,6-di-tert-butyl-4-methylphenyl)-2,4,8,10-tetraoxa-3,9-diphosphaspiro[5,5]undecane (produced by Adeka Corporation, PEP-36)

TABLE 11

| | Polymer property | | | | | | | |
|---|---|---|---|---|---|---|---|---|
| | | Amount of carboxyl terminals | Color tone | | | DEG content | Acetaldehyde content | Δb value | Deposit around a |
| | IV | (Eq/ton) | L value | a value | b value | [wt %] | [ppm] | 290 | spinneret |
| Example 66 | 0.66 | 33.2 | 71 | −3.0 | 0.5 | 1.1 | 15 | 3.9 | ○ |
| Example 67 | 0.66 | 30.3 | 72 | −1.3 | −2.1 | 1.0 | 10 | 0.9 | ○ |
| Example 68 | 0.66 | 30.4 | 71 | −1.4 | −2.6 | 1.0 | 10 | 1.1 | ○ |
| Example 69 | 0.66 | 30.4 | 71 | −1.2 | −0.4 | 1.1 | 12 | 1.3 | ○ |
| Example 70 | 0.66 | 33.7 | 73 | −1.1 | −2.0 | 1.5 | 14 | 3.0 | ○ |
| Example 71 | 0.66 | 32.4 | 72 | −1.5 | −2.4 | 1.2 | 9 | 1.0 | ○ |
| Example 72 | 0.66 | 32.4 | 71 | −1.6 | 1.1 | 1.4 | 8 | 2.8 | ○ |
| Example 73 | 0.66 | 32.6 | 70 | −1.6 | 1.6 | 1.5 | 12 | 2.9 | ○ |
| Example 74 | 0.66 | 30.1 | 72 | −1.3 | −1.3 | 1.1 | 11 | 1.2 | ○ |
| Example 75 | 0.66 | 30.9 | 71 | −1.5 | −1.5 | 1.0 | 12 | 1.3 | ○ |
| Example 76 | 0.66 | 30.1 | 63 | −2.5 | −3.6 | 1.3 | 10 | 1.1 | ○ |
| Example 77 | 0.66 | 30.3 | 65 | −1.4 | −2.5 | 1.1 | 10 | 1.0 | ○ |
| Example 78 | 0.66 | 31.0 | 62 | −0.2 | 0.6 | 1.2 | 11 | 1.2 | ○ |
| Example 79 | 0.66 | 30.2 | 63 | −0.4 | −0.4 | 1.2 | 11 | 1.3 | ○ |
| Example 80 | 0.66 | 31.1 | 64 | −1.0 | −0.9 | 1.0 | 9 | 1.1 | ○ |
| Example 81 | 0.66 | 31.2 | 63 | −0.3 | −2.4 | 1.2*1 | 10 | 1.3 | ○ |
| Example 82 | 0.66 | 31.0 | 63 | −1.1 | −3.5 | 1.0*2 | 10 | 1.1 | ○ |

*1DPG content [wt %]
*2DBG content [wt %]

Comparative Example 31

To an esterification reaction vessel in which 100 kg of bis(hydroxyethyl)terephthalate had been charged and which had been held at a temperature of 250° C. and a pressure of 1.2×10$^5$ Pa was feed a slurry of 82.5 kg of high purity terephthalic acid (produced by Mitsui Chemicals, Inc.) and 35.4 kg of ethylene glycols (produced by NIPPON SHOKUBAI Co., Ltd.) slowly over 4 hours, and after the completion of the feeding, an esterification reaction was performed until the temperature of the distillate became lower than 90° C., and then 101.5 kg of the resulting esterification reaction product was transferred to a polycondensation vessel.

An ethylene glycol solution of magnesium acetate in an amount of corresponding to 5 ppm in terms of magnesium atom relative to the polymer to be obtained and tetrakis(2,4-di-tert-butyl-5-methylphenyl) [1,1-biphenyl]-4,4'-diylbisphosphonite (produced by OSAKI INDUSTRY Co., Ltd., GSY-P101) in an amount of corresponding to 10 ppm in terms of phosphorus atom relative to the polymer to be obtained were mixed in advance in another mixing vessel 30 minutes before being added to the esterification reaction product and were stirred at normal temperature for 30 minutes, and the resulting mixture was added to the esterification reaction product. Five minutes thereafter, catalyst TPT (titanium tetraisopropoxide) in an amount corresponding to 5 ppm in terms of titanium atom relative to the polymer to be obtained was added and further 5 minutes later, an ethylene glycol slurry of titanium oxide particles in an amount of 0.3% by weight in terms of titanium oxide particles relative to the polymer to be obtained was added. And further 5 minutes later, the pressure of the reaction system was reduced, so that the reaction was started. The temperature in the reactor was increased from 250° C. to 290° C. slowly and the pressure was reduced to 40 Pa. Both a time to be required for reaching the final temperature and that to be required for reaching the final pressure were adjusted to 60 minutes. When a prescribed stirring torque was achieved, the reaction system was returned to normal pressure by nitrogen purge, so that the polycondensation reaction was stopped. Then, the product was discharged into a strand form and cut immediately, affording pellets of a polymer. The time taken from the start of the pressure reduction to the arrival at the prescribed stirring torque was 2 hours. The resulting polymer was rich yellow in color tone and was rich in acetaldehyde and they were very large in Δb value 290, so that they were polymers inferior in heat resistance.

Moreover, this polyester was vacuum dried at 150° C. for 12 hours, then fed to a spinning machine, subsequently melted with a melter, and thereafter discharged through a spinning pack section, and pulled at a rate of 1000 m/min. In the melt spinning step, almost no deposition around the spinneret holes during spinning and almost no increase in filtering pressure were observed.

Comparative Example 32

A polyester was polymerized and melt-spun in the same manner as in Comparative Example 31 except for adding antimony oxide (produced by Nihon Seiko Co., Ltd.), which was an antimony compound, instead of the titanium compound and increasing the added amount of a phosphorus compound. It was a polymer satisfactory in polymer color tone and heat resistance, but the esterification reaction time was long, a deposit was found around spinneret holes in melt spinning, and increase in filtering pressure and filament breakage occurred.

Comparative Examples 33 to 43

Polyesters were polymerized and melt-spun in the same manner as in Example 50 except for changing the catalyst as shown in Table 12. Every polymer was rich yellow in color tone and was rich in acetaldehyde.

Comparative Example 44

A polyester was produced in the same manner as in Example 50 except for using C-1 as a catalyst for polyester production and adding mannitol aside from the catalyst to the esterification reaction vessel so that the molar ratio mannitol/Ti would become 2. The resulting polymer was rich yellow in color tone and was rich in acetaldehyde.

Comparative Example 45

A polyester was polymerized and melt-spun in the same manner as in Example 50 except for adding antimony oxide, which was an antimony compound, instead of the titanium compound and increasing the added amount of a phosphorus compound. It was a polymer satisfactory in polymer color tone and heat resistance, but a deposit was found around spinneret holes in melt spinning, and increase in filtering pressure and filament breakage occurred.

TABLE 12

| | Catalyst/Additive | | | | | | | | | | |
|---|---|---|---|---|---|---|---|---|---|---|---|
| | Titanium catalyst (antimony compound in Comparative Examples 6 and 20 only) | | | Phosphorus compound | | Magnesium compound | | Tone tone adjusting agent | | | |
| | Kind | Ti added content in PET (in terms of atom) [ppm] | Mannitol Added content in PET [ppm] | Kind | Added content (in terms of atom) [ppm] | Kind | Added content (in terms of atom) [ppm] | Kind | Added content [ppm] | Molar ratio of P/Ti | Esterification reaction time [min] | Polymerization time [min] |
| Comparative Example 31 | TPT | 5 | 38 | Phosphorus compound 1 | 10 | Magnesium acetate | 5 | — | — | 3.11 | 300 | 120 |
| Comparative Example 32 | Antimony oxide | 250 | 0 | Phosphorus compound 1 | 15 | Magnesium acetate | 5 | — | — | — | 300 | 140 |
| Comparative Example 33 | C-1 | 5 | 0 | Phosphorus compound 1 | 10 | Magnesium acetate | 5 | — | — | 3.11 | 295 | 249 |
| Comparative Example 34 | C-2 | 5 | 0 | Phosphorus compound 1 | 10 | Magnesium acetate | 5 | — | — | 3.11 | 299 | *1 |
| Comparative Example 35 | C-3 | 5 | 10 | Phosphorus compound 1 | 10 | Magnesium acetate | 5 | — | — | 3.11 | 311 | 210 |
| Comparative Example 36 | C-4 | 5 | 76 | Phosphorus compound 1 | 10 | Magnesium acetate | 5 | — | — | 3.11 | 300 | 217 |
| Comparative Example 37 | C-5 | 5 | 76 | Phosphorus compound 1 | 10 | Magnesium acetate | 5 | — | — | 3.11 | 303 | 200 |
| Comparative Example 38 | C-6 | 5 | 76 | Phosphorus compound 1 | 10 | Magnesium acetate | 5 | — | — | 3.11 | 224 | 193 |
| Comparative Example 39 | C-7 | 5 | 0 | Phosphorus compound 1 | 10 | Magnesium acetate | 5 | — | — | 3.11 | 287 | 216 |
| Comparative Example 40 | C-8 | 5 | 0 | Phosphorus compound 1 | 10 | Magnesium acetate | 5 | — | — | 3.11 | 299 | 217 |

TABLE 12-continued

| | Catalyst/Additive | | | | | | | | | | |
|---|---|---|---|---|---|---|---|---|---|---|---|
| | Titanium catalyst (antimony compound in Comparative Examples 6 and 20 only) | | Phosphorus compound | | Magnesium compound | | Tone tone adjusting agent | | Molar ratio of P/Ti | Esteri- fication reaction time [min] | Poly- mer- ization time [min] |
| | Kind | Ti added content in PET (in terms of atom) [ppm] | Mannitol Added content in PET [ppm] | Kind | Added content (in terms of atom) [ppm] | Kind | Added content (in terms of atom) [ppm] | Kind | Added content [ppm] | | | |
| Comparative Example 41 | C-9 | 5 | 0 | Phosphorus compound 1 | 10 | Magnesium acetate | 5 | — | — | 3.11 | 309 | 218 |
| Comparative Example 42 | C-10 | 5 | 0 | Phosphorus compound 1 | 10 | Magnesium acetate | 5 | — | — | 3.11 | 300 | 221 |
| Comparative Example 43 | C-11 | 5 | 0 | Phosphorus compound 1 | 10 | Magnesium acetate | 5 | — | — | 3.11 | 310 | 239 |
| Comparative Example 44 | C-1 | 5 | 38 *2 | Phosphorus compound 1 | 15 | Magnesium acetate | 5 | — | — | 4.57 | 198 | 224 |
| Comparative Example 45 | Anti- mony oxide | 260 | 0 | Phosphorus compound 1 | 15 | Magnesium acetate | 5 | — | — | — | 303 | 235 |

*1: A polymerization reaction did not proceed to a prescribed intrinaic viscosity.
*2: Mannitol was added aside from a catalyst.

TABLE 13

| | Polymer property | | | | | | | | |
|---|---|---|---|---|---|---|---|---|---|
| | IV | Amount of carboxyl terminals (Eq/ton) | Color tone L value | Color tone a value | Color tone b value | DEG content [wt %] | Acetaldehyde content [ppm] | Δb value 290 | Deposit around a spinneret |
| Comparative Example 31 | 0.66 | 42.2 | 73 | −3.1 | 9.3 | 1.5 | 21 | 7.0 | ○ |
| Comparative Example 32 | 0.66 | 36.1 | 71 | −2.5 | 1.0 | 1.5 | 17 | 1.2 | X |
| Comparative Example 33 | 0.66 | 44.1 | 71 | −3.3 | 13.0 | 1.8 | 22 | 6.6 | ○ |
| Comparative Example 34 | — | — | — | — | — | — | — | — | — |
| Comparative Example 35 | 0.66 | 39.1 | 72 | −3.3 | 7.4 | 1.6 | 19 | 1.1 | ○ |
| Comparative Example 36 | 0.66 | 39.2 | 72 | −3.0 | 6.4 | 0.5 | 18 | 1.2 | ○ |
| Comparative Example 37 | 0.66 | 41.7 | 69 | −2.3 | 5.5 | 0.7 | 20 | 1.3 | ○ |
| Comparative Example 38 | 0.66 | 39.9 | 72 | −3.2 | 6.2 | 1.8 | 20 | 1.5 | ○ |
| Comparative Example 39 | 0.66 | 39.2 | 73 | 2.9 | 6.2 | 1.8 | 19 | 1.5 | ○ |
| Comparative Example 40 | 0.66 | 39.2 | 72 | −3.0 | 6.3 | 1.7 | 18 | 1.8 | ○ |
| Comparative Example 41 | 0.66 | 44.7 | 73 | −3.1 | 5.7 | 1.8 | 20 | 1.3 | ○ |
| Comparative Example 42 | 0.66 | 43.6 | 72 | −3.1 | 7.0 | 1.5 | 22 | 1.0 | ○ |
| Comparative Example 43 | 0.66 | 41.8 | 72 | −3.0 | 5.7 | 1.8 | 20 | 1.2 | ○ |
| Comparative Example 44 | 0.66 | 41.5 | 71 | −3.1 | 10.7 | 1.7 | 22 | 5.6 | ○ |
| Comparative Example 45 | 0.66 | 35.0 | 71 | −2.3 | 0.9 | 1.5 | 19 | 1.3 | X |

A polyester to be produced using the polymerization catalyst of embodiments of the present invention is less prone to cause increase in filtering pressure due to foreign matters caused by the catalyst and better in continuous operability, and better in thermal stability and color tone, and can drastically reduce color tone change in high temperature melt molding in comparison to polyester obtained by the conventional production method. This polyester can be used widely as molded articles for fibers, films, bottles, and so on.

The invention claimed is:

1. A polyester polymerization catalyst that is a mannitol-coordinated titanium compound produced by the reaction of a titanium compound and a mannitol in a molar ratio of titanium atom to mannitol of from 1:1 to 1:3.

2. The polyester polymerization catalyst according to claim 1, wherein the reaction of the titanium compound and the mannitol further includes a base.

3. The polyester polymerization catalyst according to claim 1, wherein the titanium compound is an ortho ester of titanium or a condensed orthoester of titanium.

4. The polyester polymerization catalyst according to claim 2, wherein the base is an amine compound or an alkali metal compound.

5. The polyester polymerization catalyst according to claim 2, wherein the reaction is performed in a molar ratio of the base to the titanium atom of the titanium compound of 1:1 to 0.01:1.

6. The polyester polymerization catalyst according to claim 1, wherein the reaction between the titanium compound and the mannitol is performed in water and/or ethylene glycol.

7. The polyester polymerization catalyst according to claim 1, wherein the reaction between the titanium compound and the mannitol occurs at a temperature of 0 to 40° C.

8. The polyester polymerization catalyst according to claim 1, wherein the titanium compound is added to mannitol dissolved in water and/or ethylene glycol.

9. The polyester polymerization catalyst according to claim 8, wherein the base is added after the titanium compound is added.

10. A method for producing a polyester, wherein a polyester polymerization catalyst that is a mannitol-coordinated titanium compound produced by the reaction of a titanium compound and a mannitol in a molar ratio of titanium atom to mannitol of from 1:1 to 1:3 is used as a polycondensation catalyst in producing a polyester by polycondensing a polymerization starting material composed of an esterification product of an aromatic dicarboxylic acid with an alkylene glycol, its low polymer, or a combination thereof.

11. A method for producing a polyester, wherein a polyester polymerization catalyst that is a mannitol-coordinated titanium compound produced by the reaction of a titanium compound and a mannitol in a molar ratio of titanium atom to mannitol of from 1:1 to 1:3 is added as an esterification reaction catalyst before an esterification reaction in producing a polyester by polycondensing a polymerization starting material composed of an esterification product of an aromatic dicarboxylic acid with an alkylene glycol, its low polymer, or a combination thereof.

12. The method for producing a polyester according to claim 10, wherein a titanium compound is added so that the amount of titanium element in the polyester produced is from 1 to 20 ppm.

* * * * *